United States Patent [19]

Flowers

[11] 4,328,197

[45] May 4, 1982

[54] METAL-MICELLE ASBESTOS AND TREATMENT OF ASBESTOS AND OTHER SILICATE MINERALS TO REDUCE THEIR HARMFUL PROPERTIES

[75] Inventor: Earl S. Flowers, Petaluma, Calif.

[73] Assignee: Flow General, Inc., McLean, Va.

[21] Appl. No.: 110,455

[22] Filed: Jan. 8, 1980

[51] Int. Cl.³ .................... C01B 33/20; C01B 33/22
[52] U.S. Cl. ............................ 423/327; 106/288 B;
106/306; 423/326; 423/331; 423/332; 428/378;
428/443
[58] Field of Search ............ 423/326, 327, 331, 332;
106/288 B, 306; 424/10, 127, 131, 140, 144,
147, 155; 428/443, 378

[56] References Cited

U.S. PATENT DOCUMENTS

| | | | |
|---|---|---|---|
| 1,920,756 | 8/1933 | Liebknecht | 210/24 |
| 3,535,150 | 10/1970 | Lipsett | 428/443 X |
| 3,692,700 | 9/1972 | Sawyer et al. | 423/331 X |
| 3,991,251 | 11/1976 | Foster et al. | 428/289 |
| 4,048,278 | 9/1977 | Mosky | 264/135 |
| 4,168,346 | 9/1979 | Pezzoli | 428/443 |
| 4,171,405 | 10/1979 | Pezzoli | 428/443 |
| 4,234,377 | 11/1980 | Pezzoli | 428/443 X |

FOREIGN PATENT DOCUMENTS

| | | |
|---|---|---|
| 1082459 | 7/1980 | Canada . |
| 1160417 | 1/1964 | Fed. Rep. of Germany . |
| 16960 | of 1912 | United Kingdom . |
| 291002 | 3/1928 | United Kingdom . |
| 933390 | 8/1963 | United Kingdom . |
| 1283033 | 7/1972 | United Kingdom . |

OTHER PUBLICATIONS

Naumann et al. "J. Colloid Interface Sci" 1968, vol. 27, No. 1, pp. 133-140.
Papirer et al. "Bull. Soc. Chim. Fr." 1976, No. 5-6, pp. 654-657.
Petrov "Chemical Abstracts" vol. 54, 1960, 5207(i)-5208(a).
Naumann et al. "Chemical Abstracts" vol. 69, 1968, 5468t.
Reber "Chemical Abstracts" vol. 84, 1976, 185340m.
Papirer "Chemical Abstracts" vol. 85, 1976, 163431k.

*Primary Examiner*—Edward J. Meros
*Attorney, Agent, or Firm*—Finnegan, Henderson, Farabow, Garrett & Dunner

[57] ABSTRACT

Silicate minerals, including asbestos fibres, are rendered less harmful by forming metal-micelle polymer coatings on the silicate. A metal-micelle polymer coating is formed on a silicate by contacting a silicate mineral, such as asbestos, with a metal-weak base-strong acid aqueous ion system, or a metal-strong base-weak acid ion system. In these systems the metal is selected from the group consisting of manganese, chromium, cobalt, iron, copper, aluminum and mixtures of these metals. The product of reacting asbestos fibres with these systems is less irritating to living cells than asbestos fibres and also has substantially the same physical and chemical properties as asbestos fibres and can thus be substituted for asbestos fibres in most technological applications.

31 Claims, 13 Drawing Figures

SCHEMATIC DIAGRAM OF TREATMENT PROCESS

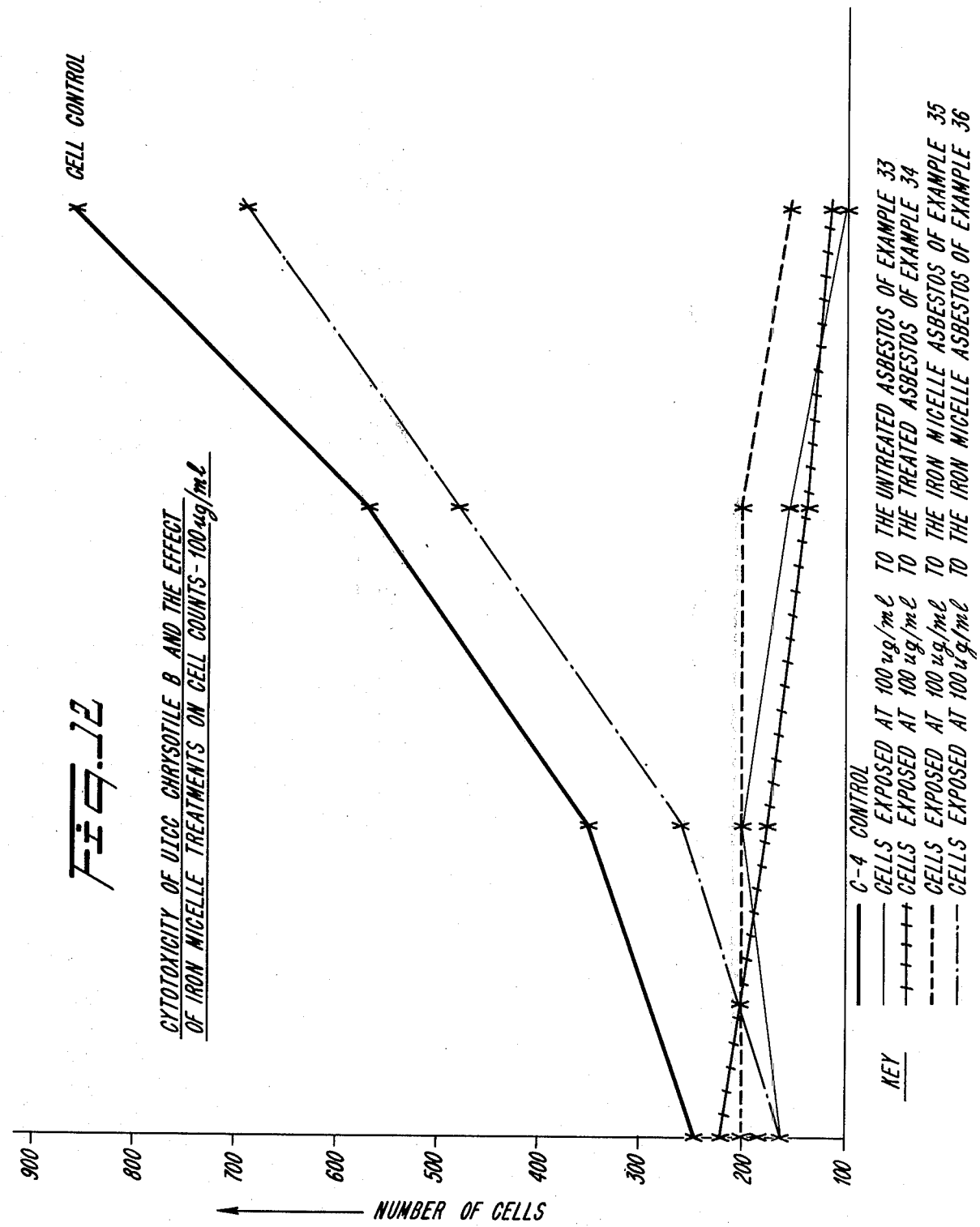

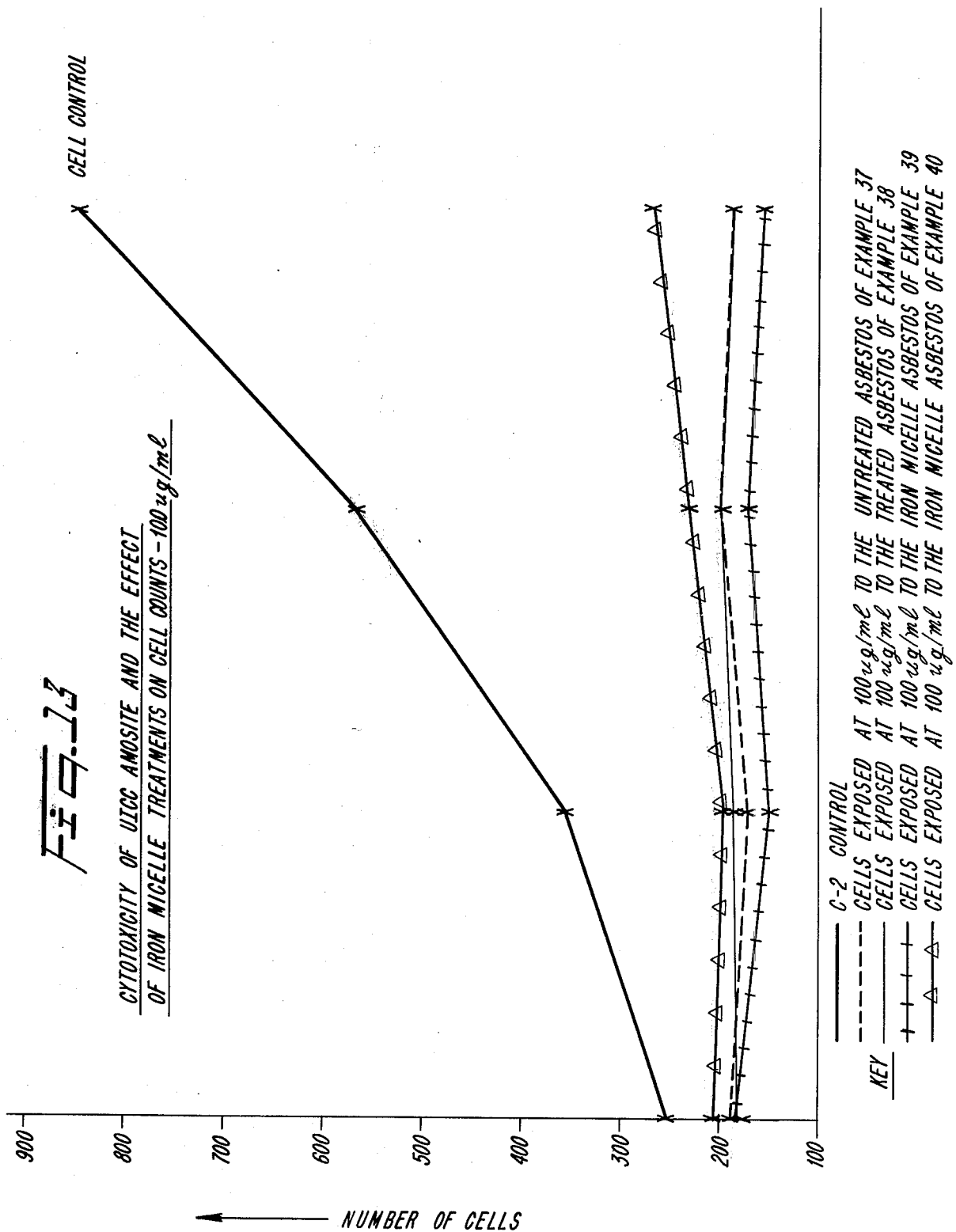

METAL-MICELLE ASBESTOS AND TREATMENT OF ASBESTOS AND OTHER SILICATE MINERALS TO REDUCE THEIR HARMFUL PROPERTIES

BACKGROUND OF THE INVENTION

The present invention principally relates to a treatment of silicate minerals to reduce their harmful properties by converting the silicate minerals to metal-micelle silicates. More specifically, the invention relates to a treatment of the silicate mineral asbestos to reduce its harmful properties by converting the asbestos to metal-micelle asbestos. The invention also relates to technological applications of both the metal-micelle silicate compositions and the presently disclosed method for making such silicate compositions. In addition, the invention relates to a method for lowering the magnetic rating of iron-containing silicate minerals such as asbestos, and to a method for reducing the environmental hazards associated with packaging and shipping of dry silicate minerals.

In general, a silicate includes any of the widely occurring compounds containing silicon, oxygen, and one or more metals, with or without hydrogen. More specifically, silicate minerals comprise the bulk of the outer crust of the earth and form in a wide range of geologic environments. All silicate minerals are built of a fundamental structural unit, the so-called $SiO_4$ tetrahedron.

The crystal structure may be based on isolated $SiO_4$ groups or, since each of the four oxygen ions can bond to either one or two silicon (Si) ions, on $SiO_4$ groups shared in such a way as to form complex isolated groups or indefinitely extending chains, sheets, or three-dimensional networks. Mixed structures in which more than one type of shared tetrahedra are present also are known.

Silicate minerals are classified according to the nature of the sharing mechanism, as revealed by x-ray diffraction study, and an abbreviated form of such a classification is given below.

| Type | Nature of Si-O linkage | Si/O ratio | Examples |
|---|---|---|---|
| Nesosilicates | Isolated $SiO_4$ groups | 1:4 | Olivine, garnet |
| Sorosilicates | Isolated compound groups, $Si_2O_7$, $Si_6O_{18}$, and so on | 2:7, 6:18, and so on | Thortveitite, beryl |
| Inosilicates | 1-Dimensional extended chains and bands | 1:3, 4:11 and so on | Amphiboles, pyroxenes |
| Phyllosilicates | 2-Dimensional extended sheets | 2:5 | Mica, clays talc, chlorite |
| Tectosilicates | 3-Dimensional network | 1:2 | Feldspars, feldspathoids, zeolites |

Many silicate minerals are of economic importance. Among the clays, feldspars, and refractory minerals, andalusite and wollastonite are used in the ceramic industries, mica as an electrical insulating agent, asbestos and exfoliated vermicularite as thermal insulating agents, and garnet as an abrasive. Talc is a constituent of facial powder. Other silicates are important as ore minerals, beryllium being obtained from beryl, zirconium and hafnium from zircon, and thorium from thorite. Some silicate minerals such as jadeite and nephrite are prized as ornamental materials, and peridot, garnet, tourmaline, and aquamarine are well-known gem stones.

Various health hazards arise, however, from the inhalation of natural silicate mineral dusts. In general, silicate minerals are notorious for causing lung diseases such as silicosis. A particular manifestation of silicosis is the black lung disease coal miners contract from inhalation of coal dust and crystalline silicates.

A particularly troublesome silicate mineral is asbestos. Asbestos is a commercial term applied to several minerals which are widely utilized, primarily because of their fibrous characteristics. All asbestos minerals consist of partially open bundles of very fine fibres and most single fibrils have a channel in the center. The principal asbestos minerals are chrysotile, crocidolite, amosite and anthophyllite. Because they differ in chemical and physical properties, these minerals have different commercial applications.

Chrysotile is the serpentine variety of asbestos fibre. Chrysotile fibres occur in a wide variety of shapes. The empirical composition of chrysotile is: $3MgO.2SiO_2.H_2O$. The unit cell, however, has been represented as $Mg_6(OH)_8Si_4O_{10}$. Chrysotile forms of asbestos comprise about 95% of the world's production and are principally supplied by Canada and Rhodesia, although there are some new and relatively small sources in the United States.

All varieties of asbestos other than chrysotile belong to the amphibole group of minerals and are generically termed amphibole asbestos. The amphibole asbestos are straight fibres and are further characterized by perfect prismatic cleavage with angles of 56° and 124° between cleavage planes.

The empirical composition of crocidolite is $Na_6Fe_{10}Si_{16}O_{46}(OH)_2$. Crocidolite is the fibrous form of the mineral reibeckite. Crocidolite fibres, having an elliptical or circular cross-section, are flexible and stronger than those of chrysotile. The principal source of crocidolite is the Union of South Africa.

The empirical formula of amosite, a yellowish-grayish white variety asbestos found only in Transvaal, South Africa, is $(FeMg_7)Si_8O_{22}(OH)_2$. Amosite fibres, which exhibit a rectangular section, are harsher and ordinarily slightly weaker than those of chrysotile. Amosite fibre lengths extend to 10-11 inches.

The empirical formula of anthophyllite is $Mg_7Si_2O_{22}(OH)_2$. If unexposed to the atmosphere, anthophyllite is a greenish-gray color. On being exposed to the atmosphere, however, it yields brownish-white fibres that are short and weak and are only slightly flexible. Anthophyllite is found in Georgia and North Carolina in the United States and also in Finland.

Because of their physical and chemical properties, the asbestos minerals are extremely useful materials, presently employed in more than two thousand applications, including fireproof textiles, brake linings, thermal insulation, asbestos cement pipe, asbestos-cement sheets, paper products, gaskets, woven fabrics, high temperature insulation, chemical-resistant filters, and filler material.

Recently discovered evidence indicates, however, that introduction of asbestos into living organisms increases the organisms' risks of developing various chronic diseases, including lung cancer, chronic fibrosing processes in the lungs, and mesothelioma of the lungs or intestines. The gravity of this evidence is underscored by the widespread applications of asbestos and the resulting frequent exposure of living organisms thereto.

It is presently believed that when an asbestos fibre comes into contact with a living cell, the asbestos fibre irritates the cell and leads to its eventual weakening. After such weakening, it is believed the asbestos fibre enters into the cell.

Although it is not clear what happens when asbestos enters a cell, in the article entitled "Relationship Between Exposure to Asbestos, Collagen Formation, Ferruginous Bodies and Carcinoma," published by the inventor in the November 1974 edition of the American Industrial Hygiene Association Journal, it is postulated that entrance of asbestos into living cells results in formation of ferruginous bodies. A ferruginous body is an iron-containing protein body with a fibrous core thought to be formed by macrophage cells attempting to phagocytize a foreign fibre.

Ferruginous bodies formed in living organisms appear to occur in various shapes and sizes, including evenly distributed deposits, series of clump-like deposits, and large barbell-shaped deposits. Although sizes vary, the fibre core approximates the lengths and diameters of asbestos and other fibres found in living organisms.

It is further theorized that formation of a ferruginous body in a living cell occurs by deposition of ferritin, a crystalline iron-containing protein and/or hemosiderin, a yellowish-brown granular pigment formed by the breakdown of hemoglobin and composed essentially of ferric oxide, on an electronegative surface, such as the nucleophilic silicates present in asbestos fibres. The formation of ferruginous bodies in a living organism appears to set in motion a collagen synthesis ultimately resulting in chronic fibrosis and a potential for developing carcinoma.

Those skilled in the art have diligently sought a method for rendering asbestos less harmful without substantially affecting its significant physical and chemical properties.

Other problems associated with asbestos and other silicate minerals have plagued the art. Those in the industry have previously dry processed asbestos because the material does not handle well wet. Handling asbestos in a dry state creates asbestos dust and thus increases the possibility of introduction of asbestos into a living organism. To combat this danger, many safeguards are presently employed to prevent inhalation during the handling of asbestos. For example, expensive machinery, such as automatic bag opening machines, is frequently used. There exists, therefore, a need for a wet asbestos-like material and other silicate mineral-like materials which handle well.

Another problem of increasing concern is contamination of water supplies by asbestos fibres and other silicate minerals, particularly in areas where waste from asbestos cement plants, mines, or other processes involving asbestos or other silicate minerals comes into contact with the water supply.

Further, although unrelated to rendering asbestos less harmful, the magnetic rating of certain iron-containing silicate minerals, such as grades 4–7 of untreated asbestos, which are used in reinforcing cement and as binding agents, is too high to allow use of such asbestos as an effective electrical insulator in many applications. Decrease of the magnetic rating of such asbestos would decrease the electrical conductivity thereof and allow an expanded use of such treated asbestos grades in applications such as electrical insulating tape.

The present explosive growth in use of asbestos, moreover, compared to the rate of discovery of new sources thereof, raises the spectre of depletion of this valuable mineral by the year 2000. This danger is compounded because some portion of the existing asbestos sources cannot presently be used owing to environmental restrictions. There is, accordingly, a pressing need for a treatment of asbestos which would decrease the total use of natural asbestos fibre while at the same time facilitating use of sources of asbestos now subject to environmental restrictions.

Another problem facing technological workers involves the economic removal of acidic iron from sources such as aqueous mine drainage. Although solutions to this problem would, at first blush, seem irrelevant to methods for treating silicate minerals, including asbestos, the present invention offers a highly attractive solution to the removal of iron from aqueous solutions.

In accordance with the present invention it has been discovered that treating silicate minerals, prior to their introduction into a living organism, with an aqueous metal salt solution to form a metal-micelle silicate renders the silicate less harmful to living cells. Specifically, it has been discovered that treating asbestos, prior to its introduction into a living organism, with an aqueous metal salt solution to form metal-micelle asbestos masks the iron-binding sites in the asbestos. Hence, the metal-micelle asbestos, when introduced into a living cell, do not react with cellular iron. Accordingly, the reaction that is believed to initiate fibrosis is blocked and biological hazards associated with exposure of living organisms to asbestos are reduced. Moreover, the treatment of the present invention, in addition to rendering asbestos less harmful, provides an asbestos-like material having physical and chemical properties, such as insulating properties, reinforcing strength, binding properties and numerous additional properties, very similar to those of untreated asbestos.

The present invention thus makes it possible to replace untreated asbestos fibre by a less hazardous but equally-useful composition of matter, metal-micelle asbestos, in the multitudinous processes and products presently utilizing asbestos.

Representative applications of the metal-micelle asbestos and other metal-micelle silicates of the present invention include:

| | |
|---|---|
| 1. | Treatment of gravels or geological deposits containing asbestos or silicate minerals with a micelle-forming solution, particularly sandstones and granites. |
| 2. | Surface applications of micelle-forming solutions to existing open sources of asbestos and other silicate minerals, such as in schools, homes, offices, and recreation areas. |
| 3. | Brake-linings, gaskets, and other devices subject to friction and stress. |
| 4. | General uses as a binding agent and extender, including use as an extender and coloring agent in paint. |
| 5. | Cement. |
| 6. | Yarn spun for producing woven cloth for curtains, bags, ribbons, filters, protective coverings, etc. |
| 7. | Formation into paper or board. |
| 8. | Fluffing to form an insulating material. |
| 9. | Marine boiler insulation. |
| 10. | Treatment of demolition debris and reuse in cements |

-continued and pavings.

Moreover, the present invention comprehends treatment of asbestos and other silicate mineral hazards already in use. For example, a playground covered by gravel containing asbestos can be made less harmful simply by spraying the gravel with an appropriate metal salt aqueous solution.

The present invention also can provide both a wet asbestos-like material and a wet asbestos which handles well and which can be shipped and used as a wet cake. In addition to providing the handling advantages inherent in use of a wet cake or slurry, using the material in the form of a wet cake or slurry reduces the potential biological risks resulting from the exposure of workers to asbestos dust during dry processing.

In addition to diminishing the likelihood of the reaction that initiates fibrosis and eventuates in cancer, the metal-micelle asbestos fibres of the present invention have a slightly larger diameter than untreated asbestos fiber. This slight increase in diameter makes the metal-micelle asbestos fibres less respirable than conventional asbestos, i.e., less apt to be retained in the lungs of a living organism.

Treatment of asbestos by the method of the present invention to form a metal-micelle asbestos can increase the total weight of asbestos-like material, with an attendant decrease in the use of natural asbestos fibre in certain applications. The formation of metal-micelle asbestos, moreover, may well allow use of sources of asbestos previously subject to environmental restrictions. Accordingly, the present invention may decrease the depletion rate of world supplies of useable asbestos.

Further, the present invention provides a means for decontaminating water supplies containing asbestos fibres and other silicate minerals. Addition of an appropriate metal salt to the water removes the silicate mineral contaminant by converting it to a metal-micelle silicate.

The metal-micelle asbestos of the present invention has a lower magnetic rating than untreated asbestos. The present invention also decreases the magnetic rating of iron-containing silicates which are not converted to metal-micelle silicates. Thus, with respect to the silicate asbestos it will be possible to use additional grades of asbestos, as well as asbestos metal-micelles, in such applications as electrical insulating tape.

The present invention also provides an economical method for removing acidic iron from such sources as aqueous mine drainage. By contacting the mine drainage with a silicate, mineral such as, for example, an asbestos mat in the presence of ammonia, the iron contained in the drainage will precipitate onto the asbestos mat to form iron-micelle asbestos.

BRIEF DESCRIPTION OF THE DRAWINGS

FIG. 12 is a graphical representation of the Cytotoxicity of UICC Chrysotile B and the Effect of Iron Micelle Treatments on Cell Counts.

FIG. 13 is a graphical representation of the Cytotoxicity of UICC Amosite and the Effect of Iron Micelle Treatments on Cell Counts.

SUMMARY OF THE INVENTION

Figure 1:
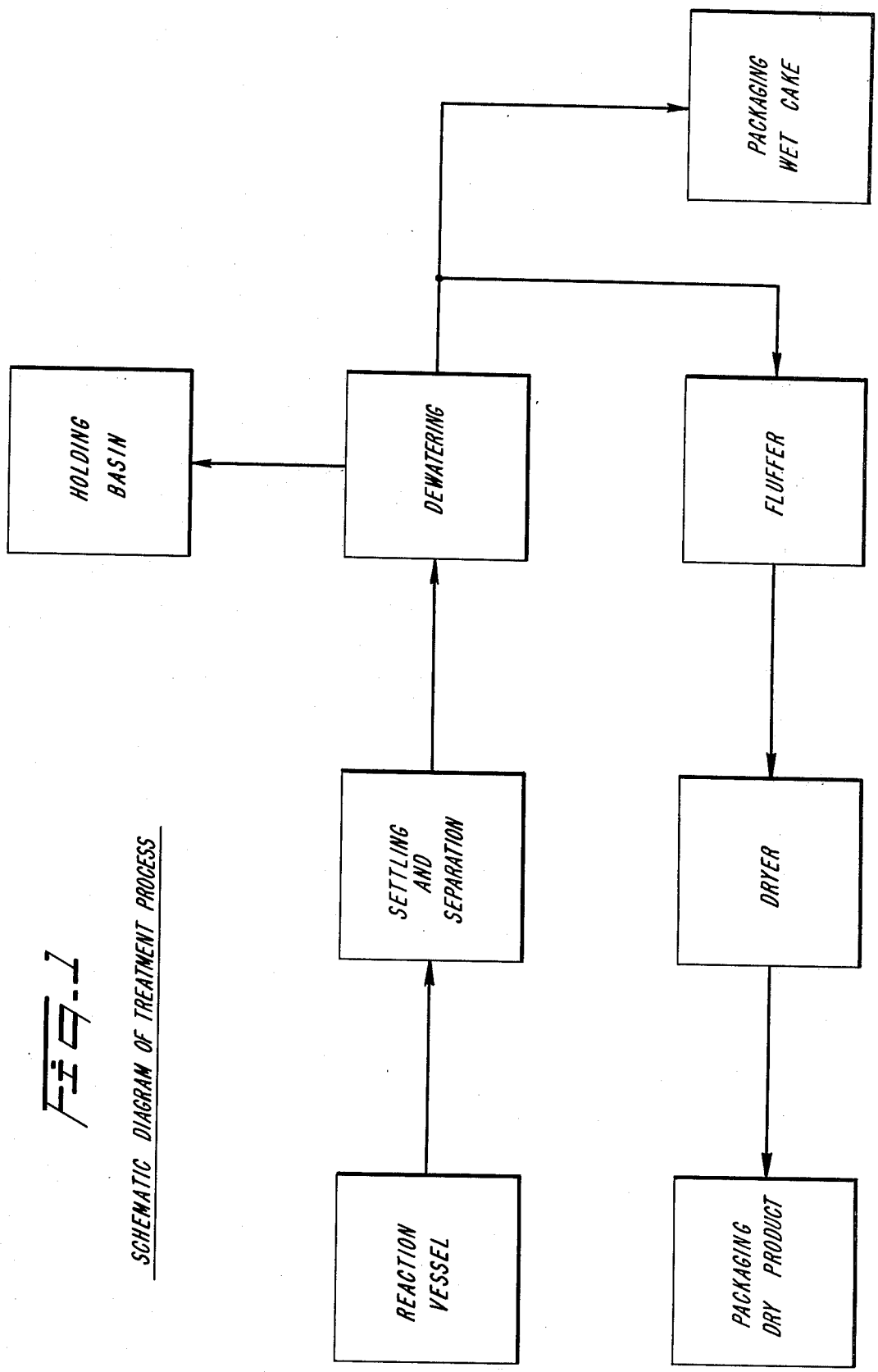
FIG. 1 is a schematic diagram of a process for treating asbestos in accordance with the present invention.

The present invention relates to a method for rendering silicate minerals less harmful to living cells comprising the step of forming a metal-micelle silicate prior to contact of the silicate with the living cells. The metal-micelle silicate is formed by contacting a silicate mineral with an aqueous solution of a weak base, strong acid or strong base weak acid salt of manganese, chromium, cobalt, iron, copper, aluminum, or mixtures thereof. The preferred metal salt is $NH_4Fe(SO_4)_2$.

More specifically, the present invention relates to a method for decreasing the irritation of living cells resulting from contact of asbestos fibres with living cells comprising the step of forming a metal-micelle asbestos prior to contact of the asbestos fibres with the living cells. This method also inhibits the formation of ferruginous bodies within living cells. The metal-micelle asbestos is formed by contacting asbestos fibres with an aqueous solution of a weak base, strong acid or strong base, weak acid salt of manganese, chromium, cobalt, iron, copper, aluminum, or mixtures thereof. The preferred metal salt is $NH_4Fe(SO_4)_2$.

The invention is further directed to a method for making metal-micelle asbestos comprising the step of contacting asbestos fibres with an aqueous solution of a weak base, strong acid or strong base, weak acid salt of manganese, chromium, cobalt, iron, copper, aluminum or mixtures thereof.

The invention is also directed to a metal-micelle asbestos comprising the reaction product of asbestos fibres with an aqueous solution of a weak base, strong acid or strong base, weak acid salt of manganese, chromium, cobalt, iron, copper, aluminum or mixtures thereof.

The invention is also directed to the following metal-micelle asbestos:

(a) a metal-micelle chrysotile asbestos having repeating units of the formula

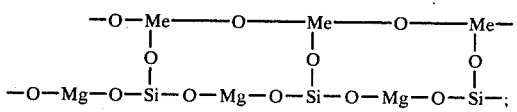

(b) a metal-micelle amosite asbestos having repeating units of the formula

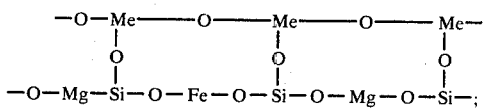

(c) a metal-micelle anthophyllite asbestos having repeating units of the formula

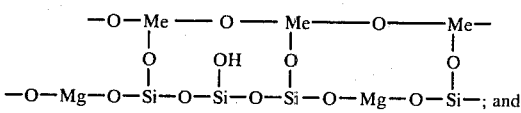

(d) a metal-micelle crocidolite asbestos having repeating units of the formula

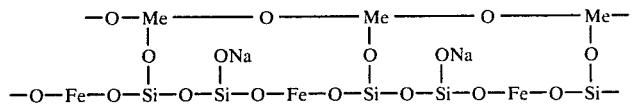

wherein Me in compounds (a)–(d) is a metal selected from the group consisting of manganese, chromium, cobalt, iron, copper, aluminum or mixtures thereof. Preferably, Me is iron (Fe).

The invention also relates to a method for decontaminating a water supply containing silicate minerals, such as asbestos fibres, by contacting the silicates in the water supply with a weak base, strong acid or strong base, weak acid salt of manganese, chromium, cobalt, iron, copper, aluminum or mixtures thereof. The preferred salt for removing asbestos fibre in this embodiment of the invention is $AlNH_4(SO_4)_2$.

Additionally, the invention relates to a method for removing acidic iron from such sources as mine drainage by contacting the acidic iron-bearing source at a pH of about 1 to 8, with a silicate mineral.

The invention further relates to the use of the metal-micelle asbestos and other metal-micelle silicate compositions in any of the currently employed or future technological applications of asbestos and other silicate minerals, including those outlined in the Background portion of this Specification.

The invention also relates to a method for lowering the magnetic rating of iron-containing silicate minerals, such as asbestos fibre, comprising the step of contacting the iron-containing silicate with (a) an aqueous solution of a weak base, strong acid or strong base, weak acid salt; or (b) an aqueous solution of a weak base, strong acid or strong base, weak acid salt of manganese, chromium, cobalt, iron, copper, aluminum or mixtures thereof.

The invention also relates to a method for reducing the environmental hazards inherent in the packaging and shipping of dry silicate minerals, including asbestos. In one embodiment of this method of the invention, a metal-micelle silicate is formed by contacting a silicate mineral with an aqueous solution of a weak base, strong acid or strong base, weak acid salt of manganese, chromium, cobalt, iron, copper, aluminum or mixtures thereof. The metal-micelle silicate can be packaged or shipped prior to dewatering.

In another embodiment of this method of the invention, the silicate mineral, rather than being converted to a metal-micelle silicate, is simply contacted with an aqueous solution of a weak base, strong acid or strong base, weak acid salt. The treated silicate can be packaged or shipped prior to dewatering.

DETAILED DESCRIPTION OF THE PREFERRED EMBODIMENTS

It has been discovered that contacting asbestos fibres with an aqueous solution of a compound selected from the group consisting of a weak base, strong acid or strong base, weak acid salt of manganese, chromium, cobalt iron, copper, aluminum and mixtures thereof produces a metal-micelle asbestos which, if introduced into a living organism, decreases the irritation of living cells and thus inhibits the formation of ferruginous bodies which can result from contacting untreated asbestos fibres with living cells. In general, the process for preparation of metal-micelle asbestos is effected by preparing a slurry of up to 3% by weight of asbestos fibres in an aqueous solution of an appropriate metal salt. In preparing iron-micelle asbestos, the reaction of the iron salt and asbestos appears to occur immediately.

The types of asbestos fibres useful in the present invention may be any available grade of chrysotile, amosite, crocidolite or anthophyllite. Moreover, any material containing asbestos fibres may also be treated in accordance with the present invention. Further, it is believed that the treatment of the present invention, utilizing the same process parameters as disclosed herein for the treatment of asbestos, will render all other silicate minerals in addition to asbestos, less harmful.

A micelle is defined as an electrically charged colloidal particle, usually organic in nature, composed of aggregates of large molecules, such as occurs in soaps and surfactants. A metal micelle is normally amorphous. Metal-micelle polymers are polymers of metal salts, oxides or hydrates which show decreasing solubility as a function of hydrogen ion content and degree of polymerization.

In accordance with the present invention, the electronegative silicates of hydrated asbestos and other silicate minerals act as sites for combination with electropositive metal-micelle polymers. A strong ionic bond is formed between the SiO of the asbestos or other silicate mineral and the metal and an ionically bonded metal-micelle polymer coating, comprising repeated —Me—O—Me—O units, forms on the asbestos fibre or other silicate mineral. The metal-micelle asbestos or other silicate polymer of the present invention is thus more highly ordered than normal metal-micelles.

In addition to providing sites for deposition of electropositive metal-micelles, the hydrated asbestos fibre and other silicate minerals of the present invention also appear to provide a catalytic surface for increasing the rate and extent of polymerization. The rate and extent of polymerization in accordance with the present invention also depend on the presence of other constituents, such as ammonium ions, sulfates, the presence or absence of dissolved gases, solubility of ions, oxidation state of the metal, and temperature.

In order for polymerization to occur to an extent sufficient to block the biologically reactive sites of the asbestos fibre in order to decrease the irritation of living cells and thus inhibit substantially the formation of ferruginous bodies, an aqueous solution of a weak base, strong acid or strong base, weak acid salt of manganese, chromium, cobalt, iron, copper and aluminum is contacted with asbestos fibres at a pH in the range of from about 1 to about 8. More preferably, the pH is in the range of from about 3 to 7. Although metal-micelle formation occurs outside these pH ranges, it occurs more slowly and less completely.

Formation of asbestos metal-micelle from appropriate salts of iron, cobalt, manganese, chromium, copper, aluminum or mixtures thereof is enhanced by increasing the pH of the solution. Accordingly, higher values within the preferred pH range of from about 1 to about 8 are specifically preferred in order to ensure sufficient polymerization.

Use of a weak base-strong acid or a strong base-weak acid salt system provides a stable pH for micelle formation. Strong acids for these systems are defined as those acids having a pK (—log acidity constant) less than the pK of the hydrated aqueous metal ion. For example, in the aqueous ferric ion system, a strong acid would be any acid with a pK less than 2.2, and in the aqueous aluminum ion system, a strong acid would be any acid with a pK less than 4.9.

Weak bases suitable for use in strong acid-weak base systems include ammonium hydroxide, bicarbonates and nitrogen containing organic bases. Specific examples of suitable weak bases, in addition to ammonium hydroxide, include sodium bicarbonate, calcium bicarbonate, and such nitrogen containing organic bases as amines or alcohol or alkylol amines, including, for example, mono-di, and triethanolamine and mixtures thereof, propanolamines, butanolamines, polynitrogenous amines such as ethylene diamine, ethylene triamine and the like, pyridine, methylpyridine, piperidine, quaternary ammonium bases such as tetraethyl ammonium hydroxide, tetra-methyl ammonium hydroxide, and in general, primary, secondary and tertiary amines substituted or not with other radicals such as hydroxy, alkyl, aryl, cycloalkyl groups, and the like.

Certain aqueous metal ion systems constitute weak acids and addition of a strong base such as sodium hydroxides, potassium hydroxide, etc., can induce formation of a metal micelle by a direct interaction. Examples of weak acids that may be used in the present invention include linoleic acid, stearic acid, oleic acid, lauric acid, capric acid, caprylic acid, ethylhexoic acid, boric acid, hypochlorous acid, carbonic acid and acetic acid.

Representative systems for providing a pH conducive to micelle formation in accordance with the present invention are:

STRONG ACID-WEAK BASE SYSTEMS (1) Hydrochloric acid/ammonium hydroxide, amines, bicarbonate (2) Nitric acid/ammonium hydroxide, amines, bicarbonates; and (3) Sulfuric acid/ammonium hydroxide, amines, bicarbonate.

WEAK ACID-STRONG BASE SYSTEMS (1) Boric acid/sodium hydroxide;

(2) Acetic acid/sodium hydroxide; and (3) Carbonic acid/sodium hydroxide.

The presently preferred metal salts for forming metal-micelle asbestos are $NH_4Fe(SO_4)_2$ (ammonium ferric sulfate) and $NH_4Fe(SO_4)_2 \cdot 12H_2O$ (ammonium ferric sulfate dodecahydrate). The sulfate ion is particularly preferred because as used in the present invention, it decreases the solubility of metals in the highest oxidation states and thus enhances precipitation of a metal-micelle polymer. Anions such as nitrates, chlorides, and halides, although useful, are not preferred because they increase the solubility of metal ions and thus interfere with the formation of the desired metal-micelle polymer.

The reaction of the present invention is operable at room temperature. Increased reaction temperature, however, enhances formation of metal-micelle asbestos, at least partly by eliminating dissolved gases such as oxygen and carbon dioxide from the reaction medium. If present, such dissolved gases interfere somewhat with the formation of the metal-micelle polymer. Accordingly, a preferred range of temperature is from about 20° C. to about 100° C., with the higher temperatures in the range being more preferred.

The present invention comprehends the addition of any and all amounts of metal to asbestos fibres or other silicate minerals to form a metal-micelle polymer. From the biological tests described herein, however, it appears that the metal-micelle asbestos of the present invention should contain at least about 5% more metal than the untreated asbestos fibre in order to effectively decrease the irritation of living cells. If, however, the metal-micelle asbestos of the present invention contains about 18% or more by weight additional metal, the strength of the resulting metal-micelle asbestos is somewhat less than that of the untreated asbestos and may thus be unacceptable for certain applications, such as asbestos cement. Accordingly, the preferred range of added metal in the metal-micelle is from about 5% to about 18% by weight, based on the total weight of the metal in the metal-micelle. The most preferred embodiment of the invention is directed to a metal-micelle asbestos having from about 5% to 10% by weight more metal than the untreated asbestos.

For other applications, such as insulating materials, binding agents for plastics, resins, asphalt and rubberized materials; heat resistant materials such as paper boards; and preparation of yarn, cloths, ribbons, filters and similar woven materials; the ten to twenty percent decreased strength of a metal-micelle asbestos containing about 18% or more by weight additional metal will not be important. Moreover, even though higher percentages of metal appear to decrease the strength of the metal-micelle asbestos, the metal-micelle asbestos is still stronger than traditional substitutes for asbestos. For example, a metal-micelle asbestos containing 18% more metal by weight than the untreated asbestos is more than twice as strong as fibrous glass. Accordingly, any decreased strength of metal-micelle asbestos may well be considered insignificant in light of the maximum strength of alternative materials and the elimination of health hazards provided by the metal-micelle asbestos of the present invention.

Moreover, a metal-micelle asbestos containing more than about 10% additional iron by weight appears to necessitate a longer draining time. This could be disadvantageous in certain processes utilizing asbestos materials, such as, for example, the present production of asbestos cement. Nonetheless, the strength of the final cement product treated in accordance with the present invention to contain a metal-micelle asbestos having from about 10% to 18% additional iron will be equivalent to the strength of currently produced asbestos cement.

In other instances, such as use of the metal-micelle asbestos of the present invention as a binding agent, insulating material, or for reinforcing of resins, a longer draining time is unimportant. Additionally, it is highly possible that any disadvantages resulting from longer draining time in a particular process will be outweighed by the reduction in health hazards resulting from the formation of the metal-micelle polymer.

The aqueous solution of metal salt may be sprayed onto asbestos materials containing asbestos, silicates, or materials containing silicate by means well-known in the art. Other means for applying the metal salt to the silicate mineral, including asbestos, include steam pressurization, dipping parts in a bath containing a micelle-forming solution and use of a brush, roller or other hand application techniques.

The schematic diagram in FIG. 1 illustrates a production process for treating asbestos in accordance with the present invention. Initially, water, asbestos, and an appropriate metal are introduced into a reaction vessel in which both pH and temperature can be carefully controlled. Following reaction, the contents of the reaction vessel, including the reaction product, metal-micelle asbestos, are conveyed to a well-known means for effecting settling and separation. After settling and separation, the reaction product is conveyed to a dewatering means such as a centrifuge, a belt filter or a vibrating screen. After dewatering, the reaction product can be packaged and shipped as a wet cake, thus reducing biological hazards associated with the handling of dry asbestos-like materials. The wet cake contains approximately 10–20% by weight water. Furthermore, packaging and shipping as a wet cake in no way diminishes the desirable properties of the metal-micelle asbestos.

Alternatively, after dewatering, the reaction product is conveyed to a fluffer, such as a rotating disc or blade shredder, followed by drying in such means as a cyclone or a rotary forced hot air draft. After drying, the reaction product is packaged for shipping.

In employing the teachings of the present invention for decontaminating water containing asbestos fibres, a preferred metal salt is $AlNH_4(SO_4)_2$. The $AlNH_4(SO_4)_2$ salt reacts with the other asbestos fibres to form a flocculant which can be physically separated from the water by means well known in the art.

In utilizing the present invention to remove acidic iron from an aqueous source such as acid-mine drainage, it is preferred that the acid-mine drainage be filtered through an asbestos mat in the presence of sufficient ammonia or other base to achieve a reaction pH of from about 1 to about 8. The resulting iron-micelle asbestos mat could subsequently be used in such typical applications of asbestos as cements, asphalts and insulation products.

A metal-micelle asbestos has a lower magnetic rating than asbestos not treated in accordance with the present invention. Even if a metal-micelle is not formed, however, the present invention can decrease the magnetic rating of iron-containing silicate minerals. To lower the magnetic rating of an iron-containing silicate, such as asbestos fibre, and thus decrease its electrical conductivity, without forming a metal-micelle, the iron-containing silicate is preferably contacted with a sufficient amount of an aqueous solution of a weak base, strong acid or strong base, weak acid salt, such as those described above in this Detailed Description, including ammonium sulfate in the absence of a metal selected from the group consisting of manganese, chromium, cobalt, iron, copper, aluminum or mixtures thereof, to carry the reaction out at a pH in the range of from about 1 to about 8, with a pH in the higher end of the range being preferred. The weak base, strong acid or strong base, weak acid salt may be formed in situ by adding, to an aqueous slurry of asbestos fibres, appropriate weak bases and strong acids or strong bases and weak acids.

Preferably, the reaction occurs in the temperature range of from about 20° C. to about 100° C. This treatment, whether or not a metal-micelle is formed, removes or masks magnetite (magnetic iron) and solubilizes $Mg++$ $(Mg(OH)_2)$ ions from the asbestos. This treatment decreases the magnetic rating, which consequently enhances the insulation properties of the asbestos fibres.

In utilizing the present invention to form cement, means well-known in the art are used to prepare a composition containing 80% to about 90% by weight calcium oxide and sand and from about 10% to about 20% by weight of a metal-micelle asbestos or other metal-micelle silicate.

In rendering silicate minerals, such as those contained in coal, less likely to cause black lung disease to those exposed to coal, the coal could be sprayed with an aqueous micelle-forming solution at the mine base. This aqueous treatment would keep dust down, as well as convert the silicate minerals to less harmful metal-micelle silicates.

The following examples are designed to elucidate the teachings of the present invention, and in no way limit the scope of the invention. Various other modifications and equivalents of the examples will readily suggest themselves to those skilled in the art, particularly after the issuance of this patent, without departing from the spirit or scope of the present invention.

Examples 1–40 relate to untreated asbestos, hydrated asbestos, and asbestos treated in accordance with the present invention. The products and untreated asbestos of Examples 1–21 were submitted for the analyses outlined in Examples 43–45. The products and untreated asbestos of Examples 23–32 were subjected to the comparative analyses detailed in Example 42, including parts A–G. The products and untreated asbestos of Examples 33–40 were biologically tested as outlined in Exaple 41.

EXAMPLE 1

Chrysotile, Union Carbide Grade 7, produced at the Union Carbide mine near King City, Calif., was obtained as a 100 pound sample in a standard commercial bag. A 1-liter bulk sample was removed for comparative analysis to be described hereafter.

EXAMPLE 2

Chrysotile, Calaveras Asbestos Grade 6, produced at the Calaveras mine located near Copperopolis, Calif., was obtained as a 100 pound sample in a standard commercial bag. A 1-liter bulk sample was removed for comparative analyses to be described hereafter.

EXAMPLE 3

Amosite, S33/85, of unspecified source, was obtained as a bulk sample from the North American Co., Chicago, Ill. A 1-liter bulk sample was removed for comparative analyses to be described hereafter.

EXAMPLE 4

Crocidolite, Grade H, blue asbestos, of unspecified source was obtained as a bulk sample from the North American Co., Chicago, Ill. A 1-liter bulk sample was removed for comparative analyses to be described hereafter.

EXAMPLE 5

39.9 grams of Chrysotile, Union Carbide Grade 7 asbestos selected from the sample mentioned in Example 1 were added to 3,500 ml of deionized water at 100° C. to form a slurry. The slurry was agitated for 10 minutes, removed from the heat source and allowed to cool while the asbestos settled. The hydrated asbestos was collected on a Whatman No. 1 filter by vacuum filtration, followed by drying at 110° C. for 16 hours. The resulting asbestos fibres were resuspended by agitation with a blender at the highest setting for one minute and 39.0 grams of product were recovered. Bulk density of the resuspended product was 0.160 g/cc.

EXAMPLE 6

41.6 grams of Chrysotile, Calaveras Grade 6 asbestos, selected from the sample mentioned in Example 2, were added to 3,500 ml of deionized water at 100° C. to form a slurry. The slurry was agitated for 10 minutes, removed from the heat source and allowed to cool while the asbestos settled. The hydrated asbestos was collected on a Whatman No. 1 filter by vacuum filtration, followed by drying at 110° C. for 16 hours. The resulting asbestos fibres were resuspended by agitating with a blender at the highest setting for one minute and 40.9 grams of product were recovered, with a bulk density of 0.166 g/cc.

EXAMPLE 7

27.6 grams of Amosite, S33/85 asbestos, selected from the sample mentioned in Example 3, were added to 3,500 ml of deionized water at 100° C. to form a slurry. The slurry was agitated for 10 minutes, removed from the heat source and allowed to cool while the asbestos settled. A black oily film separated and formed a separate layer on top of the water. The oily film was removed and discarded. The hydrated asbestos was collected on a Whatman No. 1 filter by vacuum filtration, followed by drying at 110° C. for 16 hours. The resulting asbestos fibres were resuspended by agitation with a blender at the highest setting for one minute, and 23.2 grams of product were recovered, with a bulk density of 0.090 g/cc.

EXAMPLE 8

41.3 grams of Crocidolite, Grade H Blue asbestos selected from the sample mentioned in Example 4, were added to 3,500 ml of deionized water at 100° C. to form a slurry. The slurry was agitated for 10 minutes, removed from the heat source and allowed to cool while the asbestos settled. The hydrated asbestos was collected on a Whatman No. 1 filter by vacuum filtration, followed by drying at 110° C. for 16 hours. The resulting asbestos fibres were resuspended by agitation with a blender at the highest setting for one minute, and 40.6 grams of product were recovered, with a bulk density of 0.162 g/cc.

EXAMPLE 9

35.4 grams of Chrysotile, Union Carbide Grade 7 asbestos, selected from the sample mentioned in Example 1 were added to a solution containing 70.8 grams of $NH_4Fe(SO_4)_2 \cdot 12H_2O$ (ferric ammonium sulfate dodecahydrate) in 3,500 ml of deionized water at 110° C. to form a slurry. The aqueous, iron salt solution showed a red to brown color which quickly turned yellow-brown on addition of the asbestos. A precipitate, an iron-micelle, formed on the asbestos fibre. The suspension of micelle asbestos was agitated for 10 minutes, removed from the heat source, and allowed to cool while the iron-micelle asbestos settled. The supernatant was clear with a slight yellow tinge. The iron-micelle asbestos was collected on a Whatman No. 1 filter by vacuum filtration. The filtrate was clear, and the pH was measured to be 1.8. The iron-micelle asbestos sample was dried at 110° C. for 16 hours. The dry fibrous product was resuspended by agitation with a blender at the highest setting for one minute, and 41 grams of product were recovered, with a bulk density of 0.163 g/cc.

EXAMPLE 10

63.6 grams of Chrysotile, Grade 6 Calaveras asbestos, selected from the sample mentioned in Example 2 were added to a solution containing 127.2 grams of $NH_4Fe(SO_4)_2 \cdot 12H_2O$ (ferric ammonium sulfate dodecahydrate) in 3,500 ml of deionized water at 100° C. to form a slurry. The solution of the iron salt showed a red to brown color which quickly turned yellow-brown on addition of the asbestos. A precipitate formed on the asbestos fibre. The suspension of micelle asbestos was agitated for 10 minutes, removed from the heat source and allowed to cool while the iron-micelle asbestos settled. The supernatant was clear with a slight yellow tinge. The product was collected on a Whatman No. 1 filter by vacuum filtration. The filtrate was clear, and the pH was measured to be 1.7. The product was dried at 110° C. for 16 hours. The dry fibrous product was resuspended by agitation with a blender at the highest setting for one minute. 74 grams of product were obtained, with a bulk density of 0.074 g/cc.

EXAMPLE 11

24.7 grams of Amosite, Grade S33/85 asbestos, selected from the sample mentioned in Example 3, were added to a solution containing 49.4 grams of $NH_4Fe(SO_4)_2 \cdot 12H_2O$ (ferric ammonium sulfate dodecahydrate) in 3,500 ml of deionized water at 110° C. to form a slurry. The solution of the iron salt showed a red to brown color which quickly turned yellow-brown on addition of the asbestos. A precipitate formed on the asbestos fibre. The suspension of micelle asbestos was agitated for 10 minutes, removed from the heat source, and allowed to cool while the iron-micelle asbestos settled. The supernatant was clear with a slight yellow tinge. The product was collected on a Whatman No. 1 filter by vacuum filtration. The filtrate was clear, and the pH was measured to be 1.7. The product was dried at 110° C. for 16 hours. The dry fibrous product was resuspended by agitation with a blender at the highest setting for one minute. 31 grams of product were obtained, with a bulk density of 0.031 g/cc.

EXAMPLE 12

46.1 grams of Crocidolite, Grade H Blue asbestos, selected from the sample mentioned in Example 4 were added to a solution containing 92.2 grams $NH_4Fe(SO_4)_2 \cdot 12H_2O$ (ferric ammonium sulfate dodecahydrate) in 3,500 ml of deionized water at 100° C. to form a slurry. The solution of the iron salt showed a red to brown color which quickly turned yellow-brown on addition of the asbestos. A precipitate formed on the asbestos fibre. The suspension of the asbestos was agitated for 10 minutes, removed from the heat source, and allowed to cool while the iron-micelle asbestos settled. The supernatant was clear with a slight yellow-tinge. The product was collected on a Whatman No. 1 filter by vacuum filtration. The filtrate was clear, and the pH was 1.7. The product was dried at 110° C. for 16 hours. The dry fibrous product was resuspended by agitation with a blender at the highest setting for one minute. 52 grams of product were obtained, with a bulk density of 0.052 g/cc.

EXAMPLE 13

35.6 grams of Chrysotile, Union Carbide Grade 7 asbestos, selected from the sample mentioned in Example 1, were added to a solution containing 40.0 grams of cobalt sulfate heptahydrate in 3,500 ml of deionized water at 100° C. to form a slurry. The solution of cobalt sulfate was dark red, and the asbestos suspension was stirred to provide a uniform dispersion. 30 ml of 30% reagent grade ammonium hydroxide was added to the slurry. A copius, flocculant, and blue precipitate formed on the asbestos surface. After allowing the cobalt-micelle asbestos to settle, the solution was clear and colorless. The product was collected on a Whatman No. 1 filter by vacuum filtration. The filtrate was clear with a pH of 8.6. The asbestos was dried at 110° C. for 16 hours. The dry fibrous product was resuspended by agitation with a blender at the highest setting for one minute. The product was free-flowing and had a uniform blue color. The bulk density of the product was about 0.25 g/cc.

EXAMPLE 14

20 grams of Chrysotile, Union Carbide Grade 7 asbestos, selected from the sample mentioned in Example 1 were added to a solution containing 20 grams of $Cr_2O_3$ (Chromium (III) oxide) in 3,500 ml of deionized water at 100° C. to form a slurry. The suspension was made alkaline by the addition of 30 ml of 30% reagent grade ammonium hydroxide. Heating at 100° C. was continued for 30 minutes. The suspension was removed from the heat source, and the solution was allowed to cool while the chromium-micelle asbestos settled. The sample was collected on a Whatman No. 1 filter by vacuum filtration. The filtrate was clear and its pH was 8.7. The sample was dried at 110° C. for 16 hours. The dry fibrous product was resuspended by agitating with a blender at the highest setting for one minute. The product was free-flowing and had a uniform green color. The bulk density of the product was about 0.20 g/cc.

EXAMPLE 15

20 grams of Chrysotile, Union Carbide Grade 7 asbestos, selected from the sample mentioned in Example 1, were mixed with 20 grams of chromium (III) oxide by using a blender at high speed for one minute.

EXAMPLE 16

37.6 grams of Chrysotile, Union Carbide Grade 7, asbestos, selected from the sample mentioned in Example 1, were added to a solution containing 24.0 grams of manganese sulfate in 3.5 liters of deionized water at 100° C. This was followed by addition of 30.0 ml of reagent grade ammonium hydroxide (30% concentration). The suspension was removed from the heat source and allowed to cool and settle. The manganese-micelle asbestos was collected by vacuum filtration on a Whatman No. 1 filter. The micelle asbestos was removed and dried at 110° C. for 16 hours. The dry manganese-micelle asbestos was suspended using a blender at high speed for one minute. The sample was dark brown and had a bulk density of 0.2 g/cc.

EXAMPLE 17

40 grams of Chrysotile, Union Carbide Grade 7 asbestos, selected from the sample mentioned in Example 1, were mixed with 15 grams of ferric oxide by using a blender at high speed for one minute.

EXAMPLE 18

40 grams of Chrysotile, Grade 6 Calaveras asbestos, selected from the sample mentioned in Example 2, were added to a solution containing 80 grams of $NH_4Fe(SO_4)_2.12H_2O$ (ferric ammonium sulfate dodecahydrate) in 3,500 ml of deionized water at 22° C. to form a slurry. The suspension was allowed to stand for two hours with periodic stirring. The solution retained a red to brown color. The iron-micelle asbestos was allowed to settle, and was collected on a Whatman No. 1 filter by vacuum filtration. The pH of the filtrate was 2.3. The iron-micelle asbestos was dried at 110° C. for 16 hours. The dry fibrous iron-micelle asbestos was resuspended by agitation with a blender at the highest setting for one minute and 35.6 grams of the micelle product were recovered. Bulk density of the product was 0.142 g/cc.

EXAMPLE 19

40 grams of Chrysotile, Grade 6 Calaveras asbestos selected from the sample mentioned in Example 2, were treated with the aqueous iron salt solution of Example 18, under the same conditions as in Example 18, except that 10 ml of 37% ammonium hydroxide were added. The pH of the filtrate was 2.4 and 61.8 grams of the micelle product were recovered. The bulk density of the final product was 0.247 g/cc.

EXAMPLE 20

40 grams of Chrysotile, Grade 6 Calaveras asbestos selected from the sample mentioned in Example 2 were treated with the aqueous iron salt solution of Example 18 under the same conditions as in Example 18, except 30 ml of 37% ammonium hydroxide was added to the slurry. The pH of the filtrate was measured to be 3.4, and 58.6 grams of the micelle product were recovered. The bulk density of the final product was 0.232 g/cc.

EXAMPLE 21

2 kilograms of Chrysotile, Grade 6 Calaveras asbestos, selected from the sample mentioned in Example 2, were added to a solution containing 5 kilograms of $NH_4Fe(SO_4)_2.12H_2O$ (ferric ammonium sulfate dodecahydrate) in 120 liters of tap water at 70°-80° C. to form a slurry. The slurry was stirred vigorously to produce a uniform dispersion of asbestos fibre and 1 liter of 37% ammonium hydroxide was added to ensure a complete precipitation of ferric iron onto the asbestos surface. The micelle asbestos product was allowed to settle, and the clear supernatant was decanted through a burlap cloth supported by a $\frac{1}{4}$ inch wiremesh screen. The iron-micelle asbestos was collected by decanting the settled slurry through the burlap cloth. The resulting hydrous cake of iron-micelle asbestos was dried at 110° to 135° C. for 72 hours. The dry fibrous iron-micelle asbestos was resuspended by agitation with a blender at the highest setting for one minute.

EXAMPLE 22

1 kilogram each of Chrysotile Grades 4T and 5R asbestos provided by Calaveras Asbestos Company, was added to a solution containing 2 kilograms of $NH_4Fe(SO_4)_2.12H_2O$ (ferric ammonium sulfate dodecahydrate) in 100 liters of tap water at 80° C. to form a slurry. The solution was made alkaline by addition of 500 ml of reagent grade ammonium hydroxide. The suspension was allowed to settle and cool. The iron-micelle asbestos was dark red-brown and was collected by filtration using a coarse burlap filter. The micelle asbestos was dried at 140° C. for 72 hours and then resuspended as a fibrous product by agitating small portions for one minute using a blender at the highest setting.

EXAMPLE 23

Chrysotile, Calaveras 5R Grade was obtained from Calaveras Asbestos Company. The surface area was reported by Calaveras to be 4,500 cm$^2$/g.

EXAMPLE 24

2 kilograms of Chrysotile, Calaveras 5R Grade asbestos obtained from the Calaveras Asbestos Company with a reported surface area of 4,500 cm$^2$/g were suspended in 100 liters of water at 80° C. The suspension was stirred for 10 minutes and allowed to settle and cool. The hydrated asbestos was collected by gravity filtration using a coarse burlap filter. A pressed filter cake of hydrated asbestos was sealed in a water-tight plastic bag and submitted to the Ontario Research Foundation for tests, described hereafter, as a hydrous cake having a surface area of 4,500 cm 2/g.

EXAMPLE 25

2 kilograms of Chrysotile, Calaveras 5R Grade asbestos obtained from the Calaveras Asbestos Company with a reported surface area of 4,500 cm$^2$/g were added to a solution containing 4 kilograms of $NH_4Fe(SO_4)_2.12H_2O$ (ferric ammonium sulfate dodecahydrate) in 100 liters of water at 80° C. to form a slurry. This was followed by addition of 1 liter of reagent grade ammonium hydroxide (30% concentration). The suspension was stirred for 10 minutes and allowed to settle and cool. The iron-micelle asbestos was collected by gravity filtration using a coarse burlap filter. A pressed filter cake of the micelle asbestos was sealed in a water-tight plastic bag and submitted to the Ontario Research Foundation for tests, described hereafter, as a hydrous treated cake, having 18% more iron than the untreated asbestos and having a surface area of 4,500 cm$^2$/g.

EXAMPLE 26

20 kilograms of Chrysotile, Calaveras 5R Grade asbestos from the same bag as the asbestos used in Example 23 were submitted for further processing by Calaveras Asbestos and were processed to yield a reported surface area of 13,400 cm$^2$/g. A 2 kilogram sample of this dry fibre was submitted to the Ontario Research Foundation for tests described hereafter.

EXAMPLE 27

2 kilograms of Chrysotile, Calaveras 5R Grade asbestos purchased from the Calaveras Asbestos Company with a reported surface area of 13,400 cm$^2$/g was suspended in 100 liters of water at 80° C. to form a slurry. The suspension was stirred for 10 minutes and allowed to settle and cool. The hydrated asbestos was collected by gravity filtration using a coarse burlap filter. A pressed filter cake of the hydrated asbestos was sealed in a water-tight plastic bag and submitted to the Ontario Research Foundation for tests, described hereafter, as a hydrous cake.

EXAMPLE 28

2 kilograms of Chrysotile, Calaveras 5R Grade asbestos purchased from Calaveras Asbestos Company with a reported surface area of 13,400 cm$^2$/g were suspended in a solution containing 1 kilogram of $NH_4Fe(SO_4)_2.12H_2O$ (ferric ammonium sulfate dodecahydrate) in 100 liters of water at 80° C. to form a slurry. This was followed by addition of 250 ml of reagent grade ammonium hydroxide (30% concentration) to the slurry. The suspension was stirred for 10 minutes and allowed to settle and cool. The iron-micelle asbestos was collected by gravity filtration using a coarse burlap filter. A pressed filter cake of the micelle asbestos was sealed in a water-tight plastic bag and submitted to the Ontario Research Foundation for tests, described hereafter, as a hydrous treated cake, having 5% more iron than the untreated asbestos and having a surface area of 13,400 cm$^2$/g.

EXAMPLE 29

2 kilograms of Chrysotile, Calaveras 5R Grade asbestos purchased from Calaveras Asbestos Company with a reported surface area of 13,400 cm$^2$/g were suspended in a solution containing 2 kilograms of $NH_4Fe(SO_4)_2.12H_2O$ (ferric ammonium sulfate dodecahydrate) in 100 liters of water at 80° C. to form a slurry. This was followed by addition of 500 ml of reagent grade ammonium hydroxide (30% concentration) to the slurry. The suspension was stirred for 10 minutes and allowed to settle and cool. The iron-micelle asbestos was collected by gravity filtration using a coarse burlap filter. A pressed filter cake of the micelle asbestos was sealed in a water-tight plastic bag and submitted to the Ontario Research Foundation for tests, described hereafter, as a hydrous treated cake having 10% more iron than the untreated asbestos and having a surface area of 13,400 cm$^2$/g.

EXAMPLE 30

2 kilograms of Chrysotile, Calaveras 5R Grade asbestos purchased from Calaveras Asbestos Company with a reported surface area of 13,400 cm$^2$/g were suspended in a solution containing 4 kilograms of $NH_4Fe(SO_4).12H_2O$ (ferric ammonium sulfate dodecahydrate) in 100 liters of water at 80° C. to form a slurry. This was followed by addition of 1 liter of reagent grade ammonium hydroxide (30% concentration) to the slurry. The suspension was stirred for 10 minutes and allowed to settle and cool. The iron-micelle asbestos was collected by gravity filtration using a coarse burlap filter. A pressed filter cake of the micelle asbestos was sealed in a water-tight plastic bag and submitted to the Ontario Research Foundation for tests, described hereafter, as a hydrous treated cake having 18% more iron than the untreated asbestos and having a surface area of 13,400 cm$^2$/g.

EXAMPLE 31

Cassiar Chrysotile, AAA Grade asbestos was obtained from the Ontario Research Foundation and resubmitted as received to the Ontario Research Foundation for tests, described hereafter.

EXAMPLE 32

1.5 kilograms of Cassiar Chrysotile, AAA Grade asbestos obtained from the Ontario Research Foundation were suspended in a solution containing 1.5 kilograms of $NH_4Fe(SO_4)_2.12H_2O$ (ferric ammonium sulfate dodecahydrate) in 100 liters of water at 80° C. to form a slurry. This was followed by addition of 400 ml of reagent grade ammonium hydroxide (30% concentration) to the slurry. The suspension was stirred for 10 minutes and allowed to cool and settle. The iron-micelle asbestos was collected by gravity filtration using a coarse burlap filter. A pressed filter cake of the micelle asbestos was sealed in a water-tight plastic bag and submitted to the Ontario Research Foundation for tests, described hereafter. The micelle asbestos contained 10% more iron than the untreated asbestos.

EXAMPLE 33

A 1 gram sample of Chrysotile B asbestos obtained from the International Union Contra Cancer (UICC) was agitated for one minute using a blender at the highest setting.

EXAMPLE 34

A 1.0 gram sample of UICC Chrysotile B asbestos was added to 100 ml of a 1% ammonium sulfate solution and heated at 100° C. for 10 minutes. The suspension was removed from the heat source and was allowed to settle and cool. The hydrated asbestos was collected by air pressure filtration using a millipore filter. A filter cake of the hydrated asbestos was removed from the milipore filter and was dried at 110° C. for 2 hours. The dry cake was suspended as a fibrous product using a blender at the highest speed for one minute.

EXAMPLE 35

A 1.0 gram sample of UICC Chrysotile B asbestos was added to 100 ml of deionized water at 100° C. 0.5 grams of powdered $NH_4Fe(SO_4)_2.12H_2O$ (ferric ammonium sulfate dodecahydrate) were added to the suspension. This was followed by addition of 0.125 ml of reagent grade ammonium hydroxide (30% concentration) and the suspension was maintained at 100° C. for 10 minutes. The suspension was removed from the heat source and was allowed to cool and settle. The brown iron-micelle asbestos was collected by air pressure filtration using a millipore filter. A filter cake of the micelle asbestos was removed from the millipore filter and was dried at 110° C. for 2 hours. The dry cake was suspended as a fibrous product using a blender at the highest speed for one minute. The iron micelle asbestos contained 5% by weight more iron than the untreated asbestos.

EXAMPLE 36

A 1.0 gram sample of UICC Chrysotile B asbestos was added to 100 ml of deionized water at 100° C. 1.0 gram of powdered $NH_4Fe(SO_4)_2.12H_2O$ (ferric ammonium sulfate dodecahydrate) was added to the suspension. This was followed by addition of 0.25 ml of reagent grade ammonium hydroxide (30% concentration). The suspension was maintained at 100° C. for 10 minutes. The suspension was removed from the heat source and was allowed to cool and settle. The dark brown iron-micelle asbestos was collected by air pressure filtration using a millipore filter. A filter cake of the micelle asbestos was removed from the millipore filter and was dried at 110° C. for two hours. The dry cake was suspended as a fibrous product using a blender at the highest speed for one minute. The iron-micelle asbestos contained 10% by weight more iron than the untreated asbestos.

EXAMPLE 37

A 1.0 gram sample of UICC Amosite asbestos was agitated for one minute using a blender at the highest setting.

EXAMPLE 38

A 1.0 gram sample of the UICC Amosite asbestos was added to 100 ml of a 1% ammonium sulfate solution and heated at 100° C. for 10 minutes. The suspension was removed from the heat source and was allowed to cool and settle. The asbestos was collected by air pressure filtration using a millipore filter. A filter cake of the asbestos was removed from the millipore filter and was dried at 110° C. for 2 hours. The dry asbestos cake was suspended as a fibrous product using a blender the highest setting for one minute.

EXAMPLE 39

A 1.0 gram sample of UICC Amosite asbestos was added to 100 ml of deionized water at 100° C. 0.5 grams of powdered $NH_4Fe(SO_4)_2.12H_2O$ (ferric ammonium sulfate dodecahydrate) were added to the suspension. This was followed by addition of 0.125 ml of reagent grade ammonium hydroxide (30% concentration), and the suspension was maintained at 100° C. for 10 minutes. The suspension was removed from the heat source and was allowed to cool and settle. The brown iron-micelle asbestos was collected by air pressure filtration using a millipore filter. A filter cake of the micelle asbestos was removed from the millipore filter and was dried at 110° C. for 2 hours. The dry cake was suspended as a fibrous product using a blender at the highest speed for one minute. The iron-micelle asbestos contained 5% by weight more iron than the untreated asbestos.

EXAMPLE 40

A 1.0 gram sample of UICC Amosite asbestos was added to 100 ml of deionized water at 100° C. 1.0 gram of powdered $NH_4Fe(SO_4)_2.12H_2O$ (ferric ammonium sulfate dodecahydrate) was added to the suspension. This was followed by adding 0.25 ml of reagent grade ammonium hydroxide (30% concentration) and the suspension was maintained at 100° C. for 10 minutes. The suspension was removed from the heat source and was allowed to cool and settle. The brown iron-micelle asbestos was collected by air pressure filtration using a millipore filter. A filter cake of the micelle asbestos was removed from the millipore filter and was dried at 110° C. for two hours. The dry cake was suspended as a fibrous product using a blender at the highest speed for one minute. The iron-micelle asbestos contained 10% more by weight iron than the untreated asbestos.

EXAMPLE 41—BIOLOGICAL TESTING

The product of Examples 33–40 along with two control human lung macrophage cells (P388D1), designated as C-2 and C-4, were evaluated for cytotoxicity. The results of this evaluation on human cells indicate that treatment of chrysotile asbestos fibres to contain 5% or 10% more iron decreases the cytotoxicity of the asbestos fibres. Moreover, the results indicate that treatment of amosite asbestos fibres to contain 10% more iron also decreases the cytotoxicity of the asbestos fibres.

A protocol for this assay was obtained from the National Institutes of Health and has been described in Wade, M. J., Lipkin, L. E., and Frank, A. L., Studies of In Vitro Asbestos-Cell Interaction, 2 The Journal of Environmental Pathology and Toxicology, pages 1029–1039 (1979).

The protocol for the assays is as follows:

(1) Flasks are planted with $1 \times 10^6$ P388D1 cells/flask in 10 ml of Fischer's Medium + 10% fetal calf serum;
(2) Stationary flasks are incubated at 37° C. under 5% $CO_2$ in air;
(3) After 24 hrs., the old medium is discarded, and 10 ml of fresh medium containing 100 µg/ml of test sample is added to each flask:

Two controls are employed.
1. P388D1 Cell Control
2. 100 µg/ml UICC Amosite Asbestos; and
(4) After 48 hrs. the medium in all flasks is discarded, the cell sheet rinsed once with 10 ml of phosphate buffered saline, and 10 ml of fresh (test-sample-free) medium is added to each flask.

Pictures are taken of 5 fields/flask at time zero (immediately before the addition of test sample) and at 24, 48, and 72 hrs. after exposure.

The cells appearing in each photograph are counted in a standardized manner by one observer. The total number of cells in the 5 fields/flask are tallied for each time period. (A record of each separate field count is also maintained for future statistical analysis.)

The data points at 72 hrs. are analyzed statistically for cytotoxicity using the t-Test for two independent means (the cell control and the test sample). Significance is assumed at probability 0.05.

This procedure was modified slightly by using two observers to count the numbers of cells, rather than one.

Figure 2:
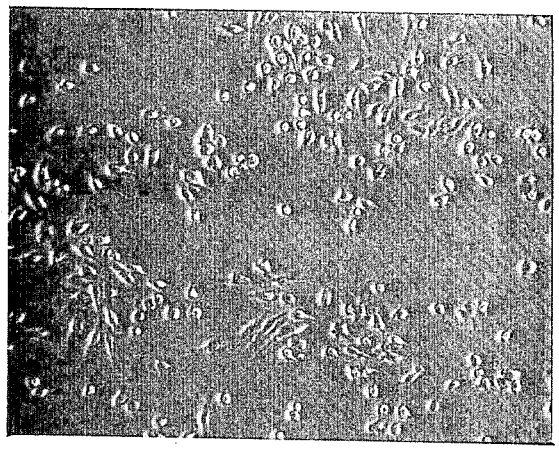
FIGS. 2 to 11 are photomicrographs showing representative results of the biological testing detailed in Example 41.

FIG. 2 is a photomicrograph of control C-2, unexposed to asbestos fibres, after seventy-two hours.

Figure 3:
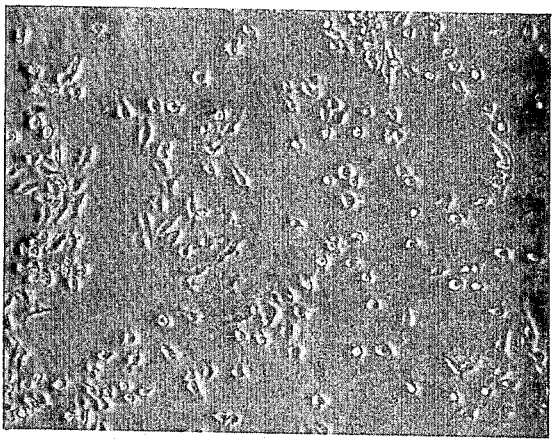

FIG. 3 is a photomicrograph of control C-4, also unexposed to asbestos fibres, after seventy-two hours.

Figure 4:
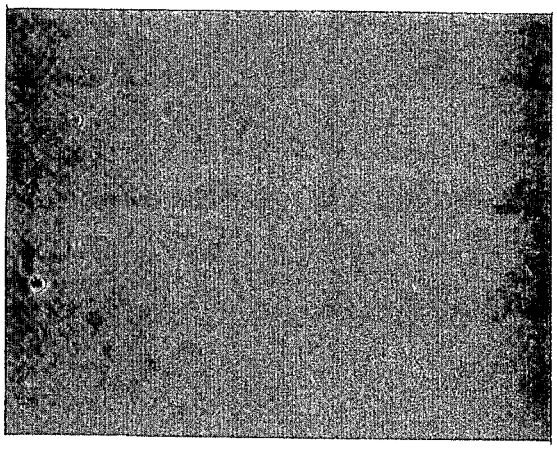

FIG. 4 is a photomicrograph of cells after seventy-two hours exposure at 100 µg/ml to the UICC Chrysotile B asbestos of Example 33.

Figure 5:
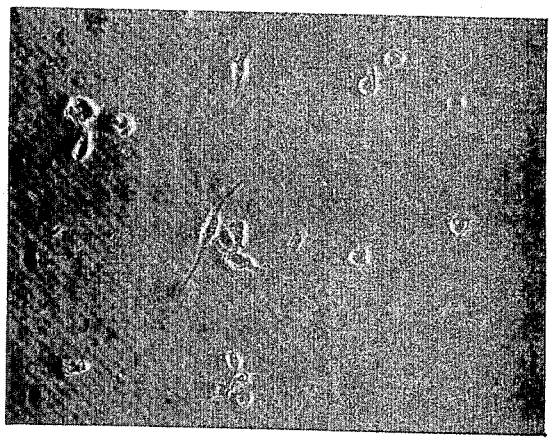

FIG. 5 is a photomicrograph of cells after seventy-two hours exposure at 100 µg/ml to the treated asbestos of Example 34.

Figure 6:
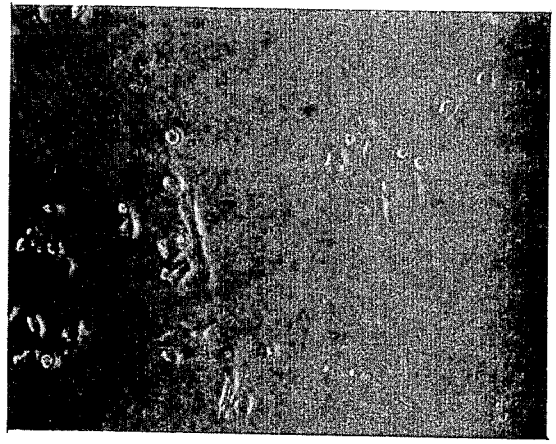

FIG. 6 is a photomicrograph of cells after seventy-two hours exposure at 100 µg/ml to the iron-micelle asbestos of Example 35, which contained 5% by weight more iron than the untreated asbestos.

Figure 7:
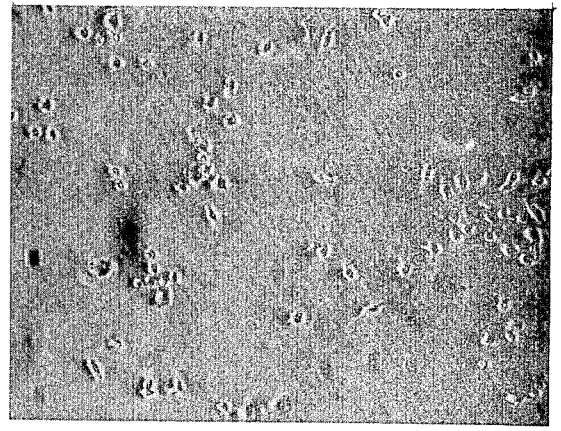

FIG. 7 is a photomicrograph of cells after seventy-two hours exposure at 100 µg/ml to the iron-micelle asbestos of Example 36, which contains 10% more iron by weight than the untreated asbestos.

Figure 8:
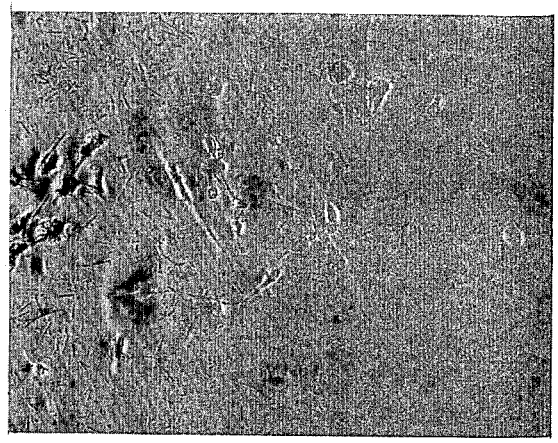

FIG. 8 is a photomicrograph of cells after seventy-two hours exposure at 100 µg/ml to the UICC Amosite asbestos of Example 37.

Figure 9:
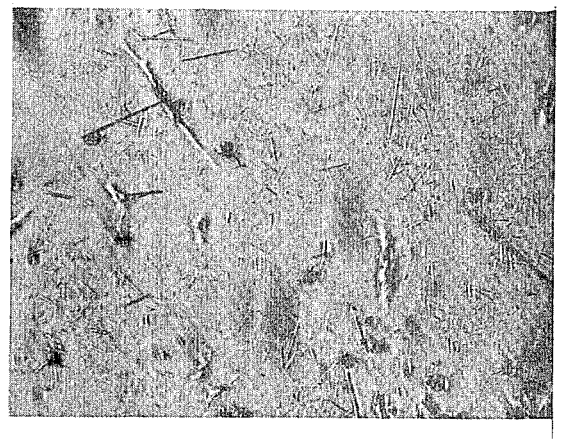

FIG. 9 is a photomicrograph of cells after seventy-two hours exposure at 100 µg/ml to the treated asbestos of Example 38.

Figure 10:

FIG. 10 is a photomicrograph of cells after seventy-two hours exposure at 100 µg/ml to the iron-micelle asbestos of Example 39, which contained 5% by weight more iron than the untreated asbestos.

Figure 11:
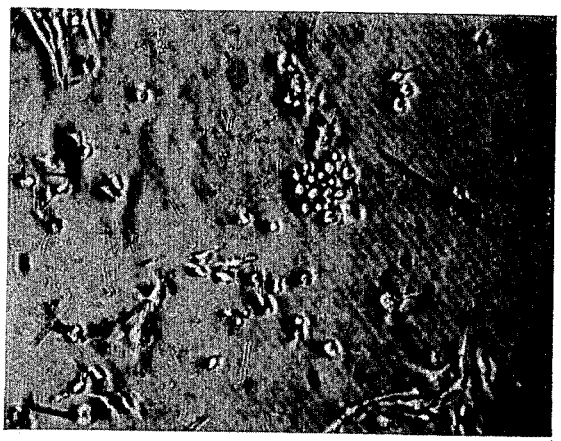

FIG. 11 is a photomicrograph of cells after seventy-two hours exposure to 100 µg/ml to the iron-micelle asbestos of Example 40, which contains 10% by weight more iron than the untreated asbestos.

The photomicrographs in FIGS. 2-7, which represent typical results of the assays, as well as the plotted results in FIG. 12, show that treatment of chrysotile asbestos with an iron salt decreases the cytotoxicity of the asbestos fibres as indicated by the higher number of cells shown in FIG. 12 for cells treated with iron-micelle asbestos. Treatment of cells with the iron-micelle asbestos of Example 36 proved to be particularly affective.

Moreover, the exposure of cells to chrysotile asbestos treated to contain an additional 10% by weight iron, as evidenced in FIG. 7, does not appear to affect the cells' morphology. Although the total numbers of cells in cultures exposed to iron-micelle asbestos appears to be less than for the controls, the number of cells in the micelle asbestos cultures is nonetheless greater than in the cultures exposed to asbestos lacking an iron treatment.

As seen by the substantial decrease in the number of cells, plotted in FIG. 12, as well as the rounded-up morphology of the cells in the photomicrographs in FIGS. 4 and 5, there is considerable cellular toxicity with untreated chrysotile or chrysotile treated with an ammonium sulfate solution.

The photomicrographs in FIGS. 8-11, which represent typical results of the assays, as well as the result plotted in FIG. 13, show that treatment of amosite asbestos with an iron salt to form a metal-micelle asbestos containing an additional 10% by weight iron decreases the cytotoxicity of the asbestos fibres when applied at a concentration of 100 µg/ml but not as dramatically as in the case of the chrysotile asbestos. At the same concentration, the treatment of amosite asbestos to contain an additional 5% by weight iron showed no statistically significant effect on cytotoxicity.

However, further tests conducted using amosite asbestos treated to contain an additional 5% by weight iron, but applying the treated amosite at the lower concentration of 50 µg/ml showed a statistically significant effect on the cytotoxicity of the amosite asbestos fibres.

EXAMPLE 42—COMPARISON OF THE PROPERTIES OF IRON-MICELLE ASBESTOS AND UNTREATED ASBESTOS

In order to assess whether asbestos retains its useful physical and chemical properties when treated with an aqueous solution of an iron salt in accordance with the present invention, physical and chemical properties of several iron-treated asbestos fibre grades were compared with the properties of the same fibres before treatment and in some cases also with the properties of hydrated asbestos. The comparison indicated that, with certain exceptions, the physical and chemical properties of asbestos fibre and iron-treated asbestos fibres are very similar.

Tests performed by the Ontario Research Foundation, Mississauga, Ontario, Canada, included standard asbestos grading tests, asbestos-cement properties, chemical resistance, resin absorption and measurement of thermal properties. Where appropriate, tests were performed according to the American Textile Institute/Quebec Asbestos Mining Association, Asbestos Test Manual (1978 Revision) or the most recent American Society for Testing and Material Standards.

The tests were performed on the treated and untreated materials described in Examples 23-32. The untreated asbestos fibres corresponding to Examples 23 and 31 were provided in a dry form. The asbestos fibres corresponding to Examples 24-30 and 32 were provided as water-saturated cakes. Correction was made for the water content in all tests requiring a weighed amount of fibre.

Routine grading tests were performed on the Cassiar AAA spinning fibres corresponding to Examples 31 and 32. The surface area of the AAA fibres corresponding to Example 31 was 4000 cm²g⁻¹. The viscosity of dispersions of AAA fibre corresponding to Examples 31 and 32 was determined by Ford Cup and Falling Ball viscometry.

EXAMPLE 42A

The following routine asbestos fibre tests were performed on the treated and untreated materials described in Examples 23–32.

| | |
|---|---|
| Bauer McNett Wet Classification | ATI/QAMA C-1-74 |
| Turner and Newall Wet Classification | ATI/QAMA C-5-72 |
| Turner and Newall Elutriation | |
| Freeness (cement grade only) | ATI/QAMA D-7-73 |
| Magnetic Rating | ATI/QAMA G-9-73 |

The Bauer McNett results, Turner and Newall Wet Classification, Turner and Newall Elutriation, Freeness and Magnetic Rating are presented in Tables I–V for all fibres tested. In all the Tables, 5R and AAA, respectively, refer to Calaveras 5R cement grade chrysotile Fibre and Cassiar AAA spinning grade chrysolite fibre and the source of each sample is identified by the appropriate Example number. No correction was made for the weight of iron deposited in the Cassiar AAA fibres.

TABLE I

BAUER-McNETT RESULTS FOR TREATED AND UNTREATED FIBRES (Average of two determinations)

| Sample | Surface Area (cm²/g) | +4 | +14 | Acc.* +14 | +35 | +200 | −200 |
|---|---|---|---|---|---|---|---|
| Example 23 | 4,500 | 8.2 | 15.0 | 23.2 | 24.0 | 13.0 | 39.8 |
| Example 24 | 4,500 | 10.2 | 17.3 | 27.5 | 23.7 | 11.7 | 37.1 |
| Example 25 | 4,500 | 12.4 | 15.4 | 27.8 | 19.0 | 10.4 | 42.8 |
| Example 26 | 13,400 | 5.6 | 10.7 | 16.3 | 24.6 | 16.0 | 43.1 |
| Example 27 | 13,400 | 6.4 | 11.0 | 17.4 | 25.0 | 17.2 | 40.4 |
| Example 30 | 13,400 | 8.1 | 8.0 | 16.1 | 16.2 | 11.8 | 55.9 |
| Example 31 | 4,000 | 80.6 | 2.6 | 83.2 | 2.5 | 3.3 | 11.0 |
| Example 32 | 4,000 | 83.8 | 2.7 | 86.5 | 2.4 | 2.3 | 8.8 |

*Acc. is an abbreviation for [supply term].

TABLE II

TURNER and NEWALL WET CLASSIFICATION FOR TREATED AND UNTREATED FIBRE (average of two determinations)

| Sample | Surface Area (cm²/g) | +7 | +14 | +25 | Acc.* +25 | +52 | +200 | −200 | Grade Factor |
|---|---|---|---|---|---|---|---|---|---|
| Example 23 | 4,500 | 0.0 | 8.3 | 23.4 | 31.7 | 18.0 | 13.9 | 36.4 | 64 |
| Example 24 | 4,500 | 0.4 | 10.5 | 26.8 | 37.7 | 18.4 | 15.1 | 28.8 | 71 |
| Example 25 | 4,500 | 0.1 | 10.4 | 22.2 | 32.7 | 12.1 | 16.3 | 38.9 | 62 |
| Example 26 | 13,400 | 0.0 | 8.4 | 19.8 | 28.2 | 15.7 | 16.9 | 39.2 | 60 |
| Example 27 | 13,400 | 0.1 | 10.0 | 22.2 | 32.3 | 16.2 | 17.0 | 34.5 | 65 |
| Example 30 | 13,400 | 0.3 | 7.9 | 14.0 | 22.2 | 9.7 | 14.7 | 53.4 | 48 |
| Example 31 | 4,000 | 59.3 | 14.4 | 7.9 | 81.6 | 4.3 | 6.2 | 7.9 | 162 |
| Example 32 | 4,000 | 67.3 | 11.4 | 4.8 | 83.5 | 3.4 | 5.2 | 7.9 | 171 |

*Acc. is an abbreviation for [supply term].

TABLE III

TURNER and NEWALL ELUTRIATOR RESULTS FOR TREATED and UNTREATED FIBRE (average of two determinations)

| Sample | Surface Area (cm²/g) | Crude | Feather | Crude + Feather | Partly Open | Open | −200 |
|---|---|---|---|---|---|---|---|
| Example 23 | 4,500 | 28.1 | — | 28.1 | 8.5 | 33.5 | 29.9 |
| Example 24 | 4,500 | 29.4 | — | 29.4 | 12.2 | 36.8 | 21.6 |
| Example 25 | 4,500 | 27.8 | — | 27.8 | 13.5 | 30.0 | 28.7 |
| Example 26 | 13,400 | 2.4 | — | 2.4 | 8.8 | 60.8 | 38.0 |
| Example 27 | 13,400 | 2.2 | 0.3 | 2.5 | 7.9 | 59.5 | 30.1 |
| Example 30 | 13,400 | 0.8 | — | 0.8 | 2.5 | 46.4 | 50.3 |
| Example 31 | 4,000 | 13.1 | 24.4 | 37.5 | 8.3 | 45.4 | 8.8 |
| Example 32 | 4,000 | 12.8 | 32.1 | 44.9 | 3.4 | 45.2 | 6.5 |

TABLE IV

FREENESS (SEC) FOR TREATED AND UNTREATED CALAVERAS FIBRES (average of 3 determinations)

| Sample | Surface Area (cm²/g) | Freeness (sec) |
|---|---|---|
| Example 23 | 4,500 | 112.6 |
| Example 24 | 4,500 | 127.5 |
| Example 25 | 4,500 | 515.0 |
| Example 26 | 13,400 | 161.5 |
| Example 27 | 13,400 | 165.3 |
| Example 28 | 13,400 | 255.4 |
| Example 29 | 13,400 | 319.0 |
| Example 30 | 13,400 | 521.2 |

TABLE V

MAGNETIC RATING OF TREATED AND UNTREATED FIBRES (Average of Two Determinations)

| Sample | Magnetic Rating |
|---|---|
| Example 26 | 2.40 |
| Example 27 | 2.03 |
| Example 28 | 1.97 |
| Example 29 | 1.97 |

TABLE V-continued

| MAGNETIC RATING OF TREATED AND UNTREATED FIBRES (Average of Two Determinations) | |
|---|---|
| Sample | Magnetic Rating |
| Example 30 | 1.62 |

As shown in Tables I to III, the Bauer-McNett, Turner and Newall Classifier and Turner and Newall Elutriator results for the 5R fibre having a surface area of 4500 cm$^2$g$^{-1}$ (Examples 23–25) and the AAA fibre (Examples 31 and 32) indicate that the treatment of the present invention has little effect on length distribution or degree of openness. The results of the three tests on the 18% treated fibre having a surface area of 13,400 cm$^2$g$^{-1}$ (Example 30) indicate some degree of fibre shortening. It is presently not understood why results of treated fibre having different surface area differ.

During the Bauer-McNetts and the Turner and Newall Classifier tests, the treated fibre was observed to coat the screens and also to reduce water flow through the screens. This observation was confirmed in the freeness test (Table IV), where the drainage time or freeness was similar for untreated and hydrated fibre at both surface areas but increased sharply for treated fibre (Examples 25 and 28–30). With respect to the samples corresponding to Examples 28–30, the freeness decreased in a relatively linear fashion with increasing iron content. No freeness tests were run on the AAA fibre of Examples 31 and 32.

As shown in Table V, the Magnetic Rating of the untreated Calaveras fibre (Example 26), which is rather high (2.40), was found to decrease on hydrating (Example 27) and to decrease further after complete treatment in accordance with the present invention (Examples 28–30). These results indicate the non-ferromagnetic nature of the iron deposited on the fibres. The decreased magnetic rating associated with the treated asbestos fibres will allow use of treated grades 4–7 asbestos fibres in such applications as electrical insulating tape. The Magnetic Rating of untreated and treated AAA fibre was not measured.

In summary, these routine tests on cement grade 5R fibre and AAA fibre indicate that the properties of the treated iron-micelle asbestos are largely unchanged from the untreated material except for the filtering or drainage properties of the 5R fibre. With respect to the 5R fibre, freeness is increased markedly by the metal salt treatment of the present invention. Because decreasing the treatment level from 18% to 5% by weight increased the filtration rate closer to the untreated fibre value, it appears that a reduction of the percentage level of treatment to the lowest value consistent with maintaining biological effectiveness may allow utilization of the fibre of the present invention in applications presently requiring low values of freeness, such as in the manufacture of asbestos-cement.

EXAMPLE 42B

The reinforcing value of the treated 5R fibre of Examples 28–30 was compared with the untreated and hydrated 5R fibre of Examples 26 and 27 according to a modified version of ASTM D3752-79 "Strength of Asbestos in a Cement Matrix". The standard, which is yet to be published, describes a method for measuring strength of circular asbestos-cement plaques in flexure after autoclaving. After first breaking the dry plaques, the plaques are further prepared by filtering a cement-/silica/asbestos dispersion, followed by pressing in a leaky mold. An accurate reflection of the drainage properties can also be obtained from the specimen preparation procedure.

The standard technique had to be modified somewhat to accommodate the hydrated and treated asbestos 5R fibre of Examples 27–30. In order to redisperse the fibre to produce a homogeneous specimen, the fibre was shaken for 15 minutes in the saturated lime-gypsum water before the cement or silica was added.

The weight of water in the treated asbestos as well as the weight of iron on the fibre, were considered in calculating the fibre content of the asbestos cement. The percentage of untreated fibre by weight of dry ingredients was kept constant at 12.5%.

The asbestos cement properties determined for the Calaveras 5R fibre are presented in Table VI.

TABLE VI

| ASBESTOS-CEMENT PROPERTIES OF TREATED AND UNTREATED CALAVERAS 5R FIBRE | | | | |
|---|---|---|---|---|
| Sample | Surface Area (cm$^2$/g$^{-1}$) | Drainage Rate (ml sec$^{-1}$) | Water Retention % | Modulus of Rupture Adjusted to 1.60 g cm$^{-3}$ (kg cm$^{-2}$) |
| Example 26* | 13,400 | 9.33 | 23.63 | 406 |
| Example 27** | 13,400 | 8.67 | 26.63 | 347 |
| Example 28** | 13,400 | 6.30 | 25.82 | 276 |
| Example 29** | 13,400 | 5.27 | 29.08 | 318 |
| Example 30** | 13,400 | 3.77 | 28.31 | 249 |

*Average of 9 specimens
**Average of 3 specimens

The strength results show some fluctuations. The hydrated asbestos fibre of Example 27 has a higher modulus of rupture than the untreated asbestos of Example 26. Treatment at the 5% and 10% levels (Examples 28 and 29) appears to have only a small influence on the strength of the asbestos cement plaque, but at 18% (Example 30) the strength is noticeably reduced. In all cases, the weight of fibre was adjusted to keep the weight of asbestos constant so asbestos weight would have no effect on the observed strength reduction at higher treatment levels.

Drainage rate gives a good relative indication of the ease of filtration of an asbestos-cement. As with freeness, as measured in Example 42A, Table IV, the hydrated asbestos of Example 27 shows only a small degradation in filtration properties but the drainage rate of the treated fibre (Examples 28–30) decreases sharply in proportion to increased percentage of metal. As seen in Table VI, the drainage rate is decreased by 60% at 18% treatment (Example 30) and by approximately 30% at 5% treatment (Example 28). The water retention of the hydrated asbestos (Example 27) and the completely-treated fibre (Examples 28–30) also is increased compared to the untreated fibre (Example 26).

Both decreased filtration rate and increased water retention could result in production problems in a present asbestos cement plant. As with freeness, however, the effect of the treatment on the drainage rate can be minimized by reducing the weight of metal deposited on the fibres.

EXAMPLE 42C

Resin Absorption was determined according to ATI/QAMA G-3-74 on 5R fibre treated with 18% iron (Example 25) and untreated 5R fibre (Example 26). The 18% treated fibre was first dried and opened in a Waring Blender to the same surface area as the untreated fibre (13,400 cm²g⁻¹). The resin used was Varcum 29-101 supplied by Reichold Chemicals Inc.

The resin absorption of untreated Calaveras 5R fibre was found to be 28.8%. The resin absorption of 18% treated Calaveras 5R at the same surface area was 27.5%. These results, which are the average of three tests, are within experimental variation in a single sample. The resin absorption thus does not appear to be measurably affected by the iron treatment of the present invention.

EXAMPLE 42D

In order to compare thermal decomposition properties, both Thermal Gravimetric Analysis (TGA) and Differential Thermal Analysis (DTA) were performed on untreated asbestos fibre (Example 23), hydrated asbestos fibre (Example 24) and 18%-treated asbestos fibre (Example 25). For TGA, 10-11 milligrams of each sample were heated at 10° C. min⁻¹ in static air to 1400° C. For DTA, 0.4 to 0.5 grams of each sample were heated at 10° C. min⁻¹ in static air to 1000° C.

The results obtained for the untreated fibre and the partially-treated fibre appeared in all aspects similar to the thermal analyses of chrysotile found in the literature. See, e.g. A. A. Hodgson, Fibrous Silicates, Royal Institute of Chemistry, Lecture Series 1965, No. 4, p. 39.

The fibre treated in accordance with the present invention at 18% iron (Example 25) lacks the endothermic peak at approximately 410°±10° C. characteristic of brucite $(Mg(OH)_2)$ but in other respects is similar to the normal chrysotile thermogram. There is some indication that at temperatures approaching 1400° C., there is a slight weight gain in the treated fibre, but the weight increase is small and may simply be attributable to experimental error.

EXAMPLE 42E

The thermal conductivities of untreated fibre (Example 26) and 18% treated fibre (Example 30) were determined according to ASTM C518-76 "Steady State Thermal Transmission Properties by Means of the Heat Flow Meter". The samples were tested in a loosely fluffed form in a polystyrene frame approximately 300 mm×300 mm×25 mm (12"×12"×1") with an opening of approximately 254 mm×254 mm×25 mm (10"×10"×1"). The fibre, which had a bulk density of 0.110 g. cm⁻³ (6.89 lb ft⁻³), was held in the frame with saran wrap on both surfaces.

The results of the thermal conductivity tests are presented in Table VII.

TABLE VII

THERMAL CONDUCTIVITY AND RESISTANCE OF LOOSE FLUFFED TREATED AND UNTREATED FIBRE area approx. 13,400 cm²/g)

| | Untreated Fibre (Example 26) | 18% Treated Fibre (Example 30) |
|---|---|---|
| METRIC UNITS | | |
| Thickness | 2.63 cm | 2.53 cm |
| Cold Side Temperature | 16.4° C. | 16.0° C. |
| Hot Side Temperature | 35.3° C. | 35.2° C. |
| Mean Temperature | 25.8° C. | 25.6° C. |
| Thermal Conductivity | 0.069 W.m⁻¹K⁻¹ | 0.061 W.m⁻¹K⁻¹ |
| Thermal Resistance | 0.382 K.m²W⁻¹ | 0.417 K.m²W⁻¹ |
| Density | 0.110 g/cm³ | 0.110 g/cm³ |
| IMPERIAL UNITS | | |
| Thickness | 1.04 in | 0.996 in |
| Cold Side Temperature | 61.6° F. | 60.8° F. |
| Hot Side Temperature | 95.5° F. | 95.3° F. |

TABLE VII-continued

THERMAL CONDUCTIVITY AND RESISTANCE OF LOOSE FLUFFED TREATED AND UNTREATED FIBRE area approx. 13,400 cm²/g)

| | Untreated Fibre (Example 26) | 18% Treated Fibre (Example 30) |
|---|---|---|
| Mean Temperature | 78.5° F. | 78.1° F. |
| Thermal Conductivity | 0.478 Btu in/hr ft²°F. | 0.220 Btu in/hr ft²°F. |
| Thermal Resistance | 2.17 hr. ft²°F./Btu | 2.37 hr. ft²°F./Btu |
| Density | 6.89 lb/ft³ | 6.89 lb/ft³ |

In both tests the density, based on the weight and volume of the sample, was 0.110 g cm⁻³ (6.89 lb ft⁻³). The differences in thermal conductivities and thermal resistances of treated and untreated fibre are small and may be explained by the difference in physical make-up of the samples. The treated sample (Example 30) which had been dried and then opened still contained some small "nubs" of unopened fibre. Considering this difference, the agreement in thermal conductivity is good. There thus appears to be little difference in the thermal conductivity of the treated asbestos relative to the untreated fibre measured in a loosely fluffed form.

EXAMPLE 42F

To evaluate the chemical resistance of asbestos fibres treated in accordance with the present invention, the extraction of iron from 18% treated asbestos fibre (Example 25) and untreated asbestos fibre (Example 23) was measured in the following media:

6 N $H_2SO_4$
6 N HCl
6 N $HNO_3$
6 N NaOH
distilled water

In all cases the weighed sample of asbestos was stirred for 3 hours at 65° C., followed by filtering in a Gooch crucible. The filtrate was then analyzed for iron content by atomic absorption spectroscopy.

The amount of iron extracted by the various media as a percentage of the original sample weight is presented in Table VIII.

TABLE VIII

WEIGHT PERCENT OF IRON EXTRACTED FROM TREATED AND UNTREATED FIBRE

| Media | 5R (Untreated) (Example 23) | 5R (18% Treated) (Example 25) |
|---|---|---|
| Distilled Water | 0.0002 | — |
| 6N NaOH | 0.0001 | 0.004 |
| 6N $HNO_3$ | 1.44 | 9.36 |
| 6N HCl | 3.51 | 12.2 |
| 6N $H_2SO_4$ | 2.39 | 12.0 |

The results indicate that the iron present in either the untreated asbestos fibre or the treated asbestos fibre is largely insoluble under neutral or basic conditions. In strongly acidic conditions, however, the iron present in both the untreated asbestos and the treated material is partially dissolved. Up to 60% of the iron deposited during treatment may be removed by 6 N HCl or $H_2SO_4$ after 3 hours at 65° C.

Chrysotile asbestos is well-known to possess little resistance to acid attack (Badollet M., Encyclopedia of Chemical Technology, Vol. 2, p. 734, 1963). It is therefore not surprising that a considerable amount of iron is extracted from the untreated fibres by boiling in the 6 N acids used in these tests. Because the lack of acid resistance of asbestos is well-known, exposure of the metal-micelle asbestos of the present invention to strong acids is not likely to be encountered in service and iron extraction should not pose a problem. Asbestos is routinely exposed to strong alkalis in asbestos-cement; however, the present iron treatment appears relatively unaffected by strong alkali (NaOH) solution.

EXAMPLE 42G

The viscosities of treated (Example 32) and untreated (Example 31) Cassiar AAA fibre dispersions were determined. The surface areas of the AAA treated and untreated fibres were both 4000 $cm^2g^{-1}$. The fibres were dispersed by tumbling a mixture of 1.5% fibre by weight in a 2% solution of sodium oleate for 24 hours. The viscosity was then determined on a No. 4 Ford Cup and in a Falling Ball Viscometer using a 15.87 mm ball in a 16.7 mm (I.D.) tube.

The results of the viscosity determination on untreated and treated AAA fibre are given in Table IX.

TABLE IX

VISCOSITY RESULTS ON CASSIAR AAA TREATED AND UNTREATED FIBRE
(average of 2 Tests)

|  |  | AAA (Untreated (Example 31) | AAA Treated (Example 32) |
|---|---|---|---|
| Falling Ball (sec) |  | 28.32 | 24.59 |
| Ford Cup (sec) | 50g | 11.34 | 5.87 |
|  | 110g | 22.56 | 12.57 |
|  | 150g | 35.71 | 19.87 |
|  | 200g | 50.82 | 28.07 |
|  | 250g | 67.49 | 37.59 |

The routine fibre tests on the AAA spinning grade presented in Tables I–III of Example 42A, indicate that the treatment of the present invention causes no significant change in length distribution of the fibres. The viscosity results presented here indicate that the viscosity of a dispersion of treated AAA fibre is lower than the untreated fibre. Lower viscosity is a distinct advantage because an increased amount of treated asbestos can be put into a slurry and materials of lower viscosity are easier to spin into threads.

In these experiments, because no correction for the amount of iron present was made, the fibre concentration is slightly too low. The large viscosity difference, however, indicates a reduction in the fibre-fibre interaction in the dispersion as a result of the treatment. The effect of this on the spinning performance of the fibres is presently unknown.

EXAMPLE 43

In order to compare the length of treated fibers to untreated fiber, twenty-one samples corresponding to Examples 1–21 were evaluated by means of transmission electron microscopy.

In order to effect some separation of the small fibres from large fibres and fibre bundles, and to achieve an adequate dispersion of fibres on the electron microscope grids, an aliquot of each sample was dispersed in 500 ml xylene in a graduated cylinder and allowed to stand for 15 minutes or longer, as visually determined from the nature of the sample. Three aliquots were taken from the upper portion of the liquid and filtered through nuclepore filters with a 0.1 m nominal pore size. The aliquot sizes were in the ratio 1:5:10, the smallest aliquot ranging in size from 1 ml to 5 ml. Grids prepared from each aliquot by standard methods were examined in the electron microscope. The measurements were made on the grids from those aliquots yielding the optimum dispersion of the fibres as judged by their overall concentration and their lack of mutual interferences.

The grids were scanned in a Philips 100C transmission electron microscope at a magnification of between 5,060× and 5,660×. The length distributions were determined with a Porton graticle superimposed on the fluorescent screen.

The results for all twenty-one samples are tabulated in Table X as the percent of fibres larger than the indicated size. In order to allow easier comparison of the samples, only a single set of fibre lengths is shown (in the first column), corresponding to those samples scanned at 5,280×. Corrections may be made for samples scanned at other magnifications by multiplying the indicated fibre lengths by the ratio of the magnifications. For this reason the magnifications are also shown in the Table. The correction factors are summarized in Table XI.

TABLE X

Fibre Length Distributions of Treated and Untreated Asbestos Samples

Percent of fibres larger than indicated length

|  | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| 0.094 | 100 | 100 | 100 | 100 | 100 | 100 | 100 | 100 | 100 | 100 |
| 0.14 | 99.6 | 98.5 | 100 | 97.0 | 100 | 99.2 | 98.0 | 97.6 | 93.2 | 100 |
| 0.20 | 97.3 | 93.9 | 100 | 90.9 | 98.8 | 97.3 | 95.7 | 91.7 | 88.4 | 97.6 |
| 0.29 | 93.8 | 79.5 | 100 | 79.9 | 94.5 | 89.8 | 88.6 | 85.0 | 81.1 | 94.8 |
| 0.41 | 83.8 | 66.2 | 98.5 | 69.3 | 85.8 | 80.9 | 77.2 | 76.3 | 63.7 | 85.2 |
| 0.58 | 66.8 | 49.8 | 96.5 | 56.4 | 76.3 | 64.1 | 59.8 | 65.6 | 49.8 | 74.4 |
| 0.82 | 49.0 | 35.8 | 90.4 | 47.0 | 63.6 | 46.1 | 41.7 | 48.2 | 35.5 | 59.2 |
| 1.15 | 33.2 | 17.1 | 77.6 | 34.5 | 52.2 | 30.1 | 26.0 | 33.6 | 23.2 | 42.8 |
| 1.6 | 22.8 | 8.0 | 55.6 | 23.9 | 41.1 | 18.8 | 13.8 | 23.7 | 12.7 | 26.8 |
| 2.3 | 11.2 | 3.8 | 39.0 | 12.9 | 31.6 | 12.1 | 7.5 | 14.2 | 6.6 | 14.0 |
| 3.3 | 6.2 | 2.7 | 21.2 | 8.0 | 19.0 | 6.6 | 3.9 | 7.5 | 2.3 | 7.2 |
| 4.6 | 2.7 | 0.77 | 7.0 | 2.7 | 13.0 | 1.56 | 1.58 | 1.58 | 1.14 | 2.0 |
| 6.5 | 0.78 | 0. | 1.54 | 0.39 | 4.3 | 0.39 | 0. | 0.39 | 0. | 0. |
| 9.2 | 0. | 0. | 0. | 0. | 0. | 0. | 0. | 0. | 0. | 0. |
| magnification | 5,280 | 5,280 | 5,280 | 5,660 | 5,660 | 5,280 | 5,280 | 5,660 | 5,660 | 5,060 |
| $\bar{l}$ (um) | 0.92 | 0.59 | 1.83 | 0.64 | 1.17 | 0.62 / 2.9 | 0.70 | 0.73 | 0.53 | 1.00 |
| $\sigma$ | 2.24 | 2.36 | 1.92 | 2.85 | 3.07 | 1.82 / 1.81 | 2.14 | 2.60 | 2.57 | 2.18 |

Percent of fibres larger than indicated length

TABLE X-continued

| | Fibre Length Distributions of Treated and Untreated Asbestos Samples | | | | | | | | | | |
|---|---|---|---|---|---|---|---|---|---|---|---|
| | Ex. 11 | Ex. 12 | Ex. 13 | Ex. 14 | Ex. 15 | Ex. 16 | Ex. 17 | Ex. 18 | Ex. 19 | Ex. 20 | Ex. 21 |
| 0.094 | 100 | 100 | 100 | 100 | 100 | 100 | 100 | 100 | 100 | 100 | 100 |
| 0.14 | 100 | 100 | 96.0 | 100 | 94.9 | 93.1 | 94.9 | 100 | 98.8 | 94.9 | 98.0 |
| 0.20 | 100 | 99.6 | 90.2 | 91.7 | 85.1 | 86.9 | 88.3 | 96.9 | 96.8 | 87.9 | 94.1 |
| 0.29 | 100 | 99.6 | 82.4 | 85.7 | 78.4 | 76.2 | 78.3 | 90.8 | 93.3 | 80.1 | 87.0 |
| 0.41 | 98.4 | 98.0 | 72.2 | 76.2 | 67.2 | 62.7 | 61.7 | 79.6 | 83.3 | 64.8 | 77.6 |
| 0.58 | 96.4 | 92.5 | 55.7 | 58.7 | 52.9 | 41.9 | 43.5 | 61.9 | 68.7 | 46.9 | 60.6 |
| 0.82 | 91.3 | 85.8 | 38.0 | 42.5 | 38.0 | 26.9 | 25.7 | 38.5 | 44.4 | 28.9 | 44.1 |
| 1.15 | 82.1 | 66.6 | 22.8 | 28.2 | 23.1 | 15.0 | 12.2 | 19.2 | 27.4 | 13.3 | 31.5 |
| 1.6 | 69.4 | 50.0 | 12.2 | 17.1 | 12.6 | 8.5 | 6.3 | 10.8 | 12.3 | 5.5 | 18.5 |
| 2.3 | 47.6 | 32.7 | 6.7 | 9.1 | 7.8 | 2.3 | 2.4 | 4.2 | 6.0 | 2.4 | 10.2 |
| 3.3 | 26.6 | 18.5 | 3.9 | 4.0 | 2.8 | 0.78 | 0.39 | 2.3 | 2.4 | 0.80 | 3.1 |
| 4.6 | 15.5 | 9.1 | 1.17 | 2.0 | 0.40 | 0.40 | 0. | 0.78 | 0.41 | 0. | 0.7 |
| 6.5 | 5.2 | 3.2 | 0.39 | 0. | 0. | 0. | 0. | 0. | 0. | 0. | 0.3 |
| 9.2 | 0. | 0. | 0. | 0. | 0. | 0. | 0. | 0. | 0. | 0. | 0. |
| magnification | 5,060 | 5,400 | 5,400 | 5,060 | 5,160 | 5,160 | 5,160 | 5,060 | 5,060 | 5,060 | 5,060 |
| $\bar{l}$ (um) | 2.24 | 1.7 | 0.63 | 0.76 | 0.62 | 0.51 | 0.51 | 0.78 | 0.82 | 0.54 | 0.7 |
| | 2.07 | 2.16 | 2.39 | 2.43 | 2.52 | 2.27 | 2.17 | 2.03 | 2.05 | 2.17 | 2.24 |

TABLE XI

| Corrections Applicable to the Fibre Length entries of Table X | | |
|---|---|---|
| SAMPLES | MAGNIFICATION | CORRECTION FACTOR |
| 1,2,3,6,7 | 5,280 | 1.00 |
| 4,5,8,9 | 5,660 | 0.93 |
| 10,11,14,18,19,20,21 | 5,060 | 1.04 |
| 12,13 | 5,400 | 0.98 |
| 15,16,17 | 5,160 | 1.02 |

The length distributions obtained were plotted on log-probability paper and they were adequately described by a log-normal distribution law. The sample of Example 6 seemed to be bimodal, and its distribution was accordingly decomposed into two distributions. The parameters of the distributions determined on the basis of log-normality, the geometric mean fibre length, $\bar{l}$, and the geometric standard deviation, $\sigma$, have been included in Table X. The values of $\bar{l}$ have been corrected for the deviation of the actual magnification from 5,280×.

From all the data obtained, it is concluded that fibre lengths for untreated and treated asbestos are substantially the same.

EXAMPLE 44

The twenty-one samples corresponding to Examples 1-21 were analyzed to determine if metal salt treatment of asbestos in accordance with the present invention affects the crystal structure and lattice spacings of the minerals.

A GE XRD-4 X-ray diffraction unit with a goniometer and a stationary sample holder was used. The diffracted beam was detected by a proportional counter whose signal was amplified and fed into a scaler. The goniometer could be operated in a scanning mode, or in a fixed mode. The scaler could accumulate counts during present counting times. The beam was Cu Kα radiation.

Portions of the samples were moistened with a small amount of water and packed in bakelite sample holders to a thickness of about 3 mm. The surface of the samples was smoothed with a small spatula and made flush with the surface of the sample holder to ensure reproducibility of mounting. This method of sample preparation and mounting results in various degrees of preferred orientation, which may affect relative intensities of the diffraction peak, but does not affect the measured diffraction angles to any significant degree. The angle measurements would be affected only by very small deviations of the effective planes of diffraction from coincidence with the goniometer axis.

Prior to measurement, a scan of the diffraction patterns was obtained over an appropriate angular range to identify the type of asbestos in a particular sample. The approximate diffraction angles were determined from this scan. Next, the location of an angle was determined with greater precision by taking a series of 10-second scaler counts at angles 0.10° apart in the region of the desired angle for intense reflections, and 20-seconds counts similarly in the region of a less intense reflection. 20-second or 40-second counts were taken for the final determinations, 0.05° apart below 30° (2B) and 0.1° apart for greater angles.

The results of the measurements of the diffraction angles, including the calculated d-spacings, are shown in Table XIII. Table XIII shows the data obtained from four determinations on sample no. 1, with separately prepared aliquots. These data show the precision of the measurements.

In a few instances some of the weaker reflections could not be adequately measured, as the result of some apparent line broadening, or the presence of an interference, or a reduced relative intensity caused by the chemical treatment or orientation effects. No investigations of the actual causative factor(s) was undertaken.

With these exceptions, this method of X-ray diffraction analysis indicates that the crystal structures of the asbestos forms are not measurably altered by the metal salt treatment of the present invention.

TABLE XII

| Principal lattice spacings of asbestos in treated and untreated materials | | | |
|---|---|---|---|
| SAMPLE | PEAK NO. | $2\theta^{(1)}$ | d(Å) |
| Ex. 1 | 1 | 11.95° | 7.40 |
| | 2 | 19.6° | 4.53 |
| | 3 | 24.4° | 3.65 |
| | 4 | 36.4° | 2.46 |
| | 5 | 60.2° | 1.53₅ |
| Ex. 2 | 1 | 11.80° | 7.49 |
| | 2 | 19.45° | 4.56 |
| | 3 | 24.00° | 3.70 |
| | 4 | 36.50° | 2.46 |
| | 5 | 59.95° | 1.54 |
| Ex. 3 | 1 | 10.45° | 8.45 |
| | 2 | 27.1° | 3.29 |
| | 3 | 28.9° | 3.09 |
| | 4 | 32.0° | 2.79₅ |
| Ex. 4 | 1 | 10.30° | 8.58 |

TABLE XII-continued

Principal lattice spacings of asbestos in treated and untreated materials

| SAMPLE | PEAK NO. | $2\theta^{(1)}$ | d(Å) |
|---|---|---|---|
|  | 2 | 19.45° | 4.56 |
|  | 3 | 27.1° | 3.29 |
|  | 4 | 28.45° | 3.13₅ |
|  | 5 | 32.4°₅ | 2.76 |
| Ex. 5 | 1 | 10.70° | 8.26 |
|  | 2 | 27.3° | 3.26 |
|  | 3 | 29.0° | 3.08 |
|  | 4 | 32.2° | 2.78 |
| Ex. 6 | 1 | 11.95° | 7.40 |
|  | 2 | 19.65° | 4.51 |
|  | 3 | 24.15° | 3.68 |
|  | 4 | 36.50° | 2.46 |
|  | 5 | 60.0° | 1.54 |
| Ex. 7 | 1 | 11.90° | 7.43 |
|  | 2 | 19.7° | 4.50 |
|  | 3 | 24.35° | 3.65 |
|  | 4 | 36.6° | 2.45 |
|  | 5 | 60.3° | 1.53 |
| Ex. 8 | 1 | 10.60° | 8.34 |
|  | 2 | 19.70° | 4.50 |
|  | 3 | (2) | (2) |
|  | 4 | 28.7° | 3.11 |
|  | 5 | 32.85° | 2.72 |
| Ex. 9 | 1 | 11.90° | 7.43 |
|  | 2 | 19.4° | 4.57 |
|  | 3 | 24.15° | 3.68 |
|  | 4 | 36.4° | 2.47 |
|  | 5 | 60.1° | 1.54 |
| Ex. 10 | 1 | 11.95° | 7.40 |
|  | 2 | 19.50° | 4.55 |
|  | 3 | 24.15° | 3.68 |
|  | 4 | 36.7° | 2.45 |
|  | 5 | 60.2° | 1.54 |
| Ex. 11 | 1 | 10.60° | 8.34 |
|  | 2 | 27.20° | 3.28 |
|  | 3 | 28.95° | 3.08 |
|  | 4 | 32.15° | 2.78 |
| Ex. 12 | 1 | 10.50° | 8.42 |
|  | 2 | 19.60° | 4.53 |
|  | 3 | 28.65° | 3.11 |
|  | 4 | 32.8° | 2.73 |
|  | 5 | 35.4° | 2.53 |
| Ex. 13 | 1 | 11.85° | 7.46 |
|  | 2 | (2) | (2) |
|  | 3 | 24.2° | 3.67 |
|  | 4 | (3) | (3) |
|  | 5 | 60.1° | 1.54 |
| Ex. 14 | 1 | 11.85° | 7.46 |
|  | 2 | ** | ** |
|  | 3 | 24.2° | 3.67 |
|  | 4 | (4) | (4) |
|  | 5 | (3) | (3) |
| Ex. 15 | 1 | 11.90° | 7.43 |
|  | 2 | (3) | (3) |
|  | 3 | 24.3° | 3.67 |
|  | 4 | (4) | (4) |
|  | 5 | (3) | (3) |
| Ex. 16 | 1 | 12.05° | 7.34 |
|  | 2 | (3) | (3) |
|  | 3 | 24.3° | 3.66 |
|  | 4 | 36.5° | 2.46 |
|  | 5 | 60.1° | 1.54 |
| Ex. 17 | 1 | 12.05° | 7.34 |
|  | 2 | (3) | (3) |
|  | 3 | 24.3° | 3.66 |
|  | 4 | (3) | (3) |
|  | 5 | 60.2° | 1.54 |
| Ex. 18 | 1 | 11.95° | 7.40 |
|  | 2 | 19.8° | 4.48 |
|  | 3 | 24.15° | 3.68 |
|  | 4 | (3) | (3) |
|  | 5 | (3) | (3) |
| Ex. 19 | 1 | 11.95° | 7.40 |
|  | 2 | 19.7° | 4.50 |
|  | 3 | 24.2° | 3.67 |
|  | 4 | 36.6° | 2.45 |
|  | 5 | (3) | (3) |
| Ex. 20 | 1 | 12.00° | 7.37 |
|  | 2 | 19.5° | 4.55 |
|  | 3 | 24.3° | 3.66 |
|  | 4 | (2) | (2) |
|  | 5 | 60.2° | 1.54 |
| Ex. 21 | 1 | 11.85° | 7.46 |
|  | 2 | (3) | (3) |
|  | 3 | 24.25° | 3.66 |
|  | 4 | 36.5° | 2.46 |
|  | 5 | (3) | (3) |

$^{(1)}$Cu K α radiation
(2) interfering background - unable to measure
(3) peak could not be isolated out of the background
there are two rather strong reflections at 33.3° and at 36.0° (not identified)

TABLE XIII

Precision of Diffraction Angle and D-spacing measurements

| Reflection No.: | $2\theta^1$ | d(A) | $2\theta^2$ | d(A) | $2\theta^3$ | d(A) | $2\theta^4$ | d(A) | $2\theta^5$ | d(Å) |
|---|---|---|---|---|---|---|---|---|---|---|
| Measurement No.: |  |  |  |  |  |  |  |  |  |  |
| 1 | 11.95 | 7.40 | 19.6 | 4.53 | 24.4 | 3.64 | 36.4 | 2.47 | 60.2 | 1.54 |
| 2 | 12.05 | 7.34 | 19.6 | 4.53 | 24.3 | 3.66 | 36.6 | 2.46 | 60.2 | 1.54 |
| 3 | 12.05 | 7.34 | 19.7 | 4.50 | 24.3 | 3.66 | 36.6 | 2.46 | 60.2 | 1.54 |
| 4 | 11.95 | 7.40 | 19.7 | 4.50 | 24.3 | 3.66 | 36.5 | 2.46 | 60.2 | 1.54 |
| Mean | 12.00 | 7.37 | 19.65 | 4.52 | 24.3 | 3.65 | 36.5 | 2.46 | 60.2 | 1.54 |
| std. dev. | 0.06 | 0.02 | 0.06 | 0.02 | 0.05 | 0.01 | 0.01 | 0.005 | 0 | 0 |

EXAMPLE 45

An elemental analysis of the twenty-one samples corresponding to Examples 1–21 was undertaken by the Environmental Analysis Laboratories in Richmond, Calif.

The analysis presented a great deal of difficulty. The basic procedure involved fusing an aliquot of each sample in lithium metaborate and dissoving the resulting glass button in acid, followed by quantification by atomic absorption spectrophotometry (hereinafter "AAS"). A test with chrysotile had indicated the feasibility of this procedure.

This procedure, however, proved unable to effect complete dissolution of six samples (Exs. 7, 10, 13, 14, 15 and 17). Many other attempts at dissolution also failed, including various acid treatments at room temperature and at elevated temperature, as well as in a Parr bomb, and a fusion in sodium carbonate. It is possible that more success could have been achieved with much smaller aliquots, but no such attempts were made because of the need to determine some elements that were present in rather low concentrations.

For quality control a synthetic standard was prepared from atomic absorption standard solutions and from weighed amounts of $Fe_2O_3$, $Mg(OH_2)$, and $SiO_2$. An aliquot of this standard was treated in the same manner as the samples. Recoveries were satisfactory, except for Na and Co. The sodium recovery was high, probably as a result of the presence of sodium in the KCl added for the AAS measurements. It is to be noted, however, that the sodium analysis of the dissolved samples included a determination without KCl addition. The high cobalt recovery cannot be explained satisfactorily. In reporting the data, a correction factor has been applied to account for this high recovery.

In order to obtain an analysis of the six samples that could not be brought into solution, the samples were submitted to the Crocker Nuclear Laboratory of the University of California at Davis for analysis by particle induced X-ray emission (hereinafter "PIXE"). Samples corresponding to Examples 1, 16, and 19 were also submitted in order to obtain a comparison with analyses performed by the fusion-dissolution-AAS method. Sample 2 was submitted as a normalization standard. The results are tabulated in Table XIV. The detection limits for Al, Na, and Co are not low enough for adequate comparison. The only thing that may be stated for these three elements is that the PIXE data are not inconsistent with the AAS data. For the other elements, the agreement is generally no better than within a factor of about 2, although individual sets of data may show much better agreement.

applying a correction factor of $1/0.174 = 5.75$ to the measured values.

In order to confirm the silica data so calculated, the silica content was also calculated by difference. Elemental concentrations were converted to oxides (Fe to FeO), and subtracted from 100%. The silica content was then obtained by further subtraction of the water content, determined before the samples were solubilized.

No data were obtained for Sb and Sc. Their concentrations were so low that for the application of AAS, concentration by solvent extraction, back extraction, and perhaps partial evaporation was required. The pH required for the initial solvent extraction step was too low for the silica to remain in solution, which raises questions about coprecipitation of the analytes. In addition, it was found that the method of sample solubilization caused some volatilization of antimony.

The data are presented in Table XV, where the PIXE data have been included. The first column under "$SiO_2$" designated "AAS/PIXE" contains the corrected AAS data and the PIXE data for the samples that could not be completely solubilized. The second column under "$SiO_2$" designated "diff" contains the $SiO_2$ concentra-

TABLE XIV

| | Comparison of AAS and PIXE Analyses | | | | | | | |
|---|---|---|---|---|---|---|---|---|
| SAMPLE | Ex. 1 | | Ex. 2 | | Ex. 16 | | Ex. 19 | |
| ELEMENT | LFE* | UCD** | LFE | UCD | LFE | UCD | LFE | UCD |
| Al, % | 0.3 | <0.3 | 0.39 | <0.3 | 0.081 | <0.3 | 0.30 | <0.3 |
| Fe, % | 2.1 | 0.68 | 4.1 | 5.1 | 0.81 | 0.37 | 9.5 | 4.7 |
| Mg, % | 24 | 33 | 21 | 21 | 10 | 29 | 16 | 10.4 |
| Na$_2$O, % | 0.1 | <2 | 0.07 | <2 | 0.03 | 3 | 0.05 | 2.7 |
| SiO$_2$, % | 45 | 62 | 47 | 39 | 32 | 56 | 49 | 24 |
| Co, ppm | 170 | <100 | 87 | <100 | 150 | 100 | 96 | <100 |
| Cr, ppm | 2,300 | 466 | 540 | 640 | 580 | 830 | 640 | 370 |
| Mn, ppm | 107 | 140 | 720 | 419 | 110,000 | 59,000 | 540 | 140 |
| Ni, ppm | 400 | 540 | 930 | 750 | 860 | 590 | 820 | 210 |

*Analysis by Environmental Analysis Laboratories
**Analysis by University of California at Davis A significant problem was presented by the silicon analysis. The recovery of Si in the synthetic standard was only 17.4%. Most or all of this apparent discrepancy is attributed to matrix effects in the flame. When the method of additions was applied to the standard and to samples 18 and 20, higher recoveries were obtained, but there was some lack of consistency. The data reported for $SiO_2$ have been calculated, therefore, by tions calculated by the difference method. The water content, used in this latter calculation, is shown in the last column of the table. Most of the apparent anomolies reflected in Table XV appear to be in the PIXE data. When material balances are calculated with the AAS data, it is found that they are mostly between 90 and 110%. This is not unsatisfactory in view of the fact that the precision of the analysis is between 5 and 10%. Significant deviations occur only with samples corresponding to Examples 4 and 9.

TABLE XV

| | | Al % | Fe % | Mg % | Na$_2$O % | SiO$_2$ % | | Co ppm | Cr ppm | Mn ppm | Ni ppm | H$_2$O % | Material balance % |
|---|---|---|---|---|---|---|---|---|---|---|---|---|---|
| | | | | | | AAS/PIXIE | diff. | | | | | | |
| standard | | 0.39 | 4.1 | 24 | 0.07 | 39 | | 87 | 540 | 500 | 800 | | |
| recovery, % | | 96 | 98 | 95 | 262 | 17.4 | | 223 | 106 | 102 | 106 | | |
| Example | 1 | 0.030 | 2.1 | 24 | 0.03 | 45 | | 77 | 2,300 | 100 | 400 | 13.5 | 101 |
| | 2 | 0.38 | 4.1 | 21 | 0.08 | 47 | 46 | 40 | 540 | 720 | 930 | 13.3 | 101 |
| | 3 | 0.14 | 22 | 10.5 | 0.07 | 64 | 53 | 38 | 100 | 15,700 | 160 | 0.08 | 110 |
| | 4 | 0.17 | 26 | 0.42 | 3.4 | 76 | 61 | 35 | 86 | 1,300 | 100 | 1.2 | 115 |
| | 5 | 0.37 | 25 | 1.6 | | 54 | 64 | 170 | 220 | 37,000 | 1,500 | 0.2 | 90 |
| | 6 | 0.38 | 3.8 | 19 | | 43 | 49 | 52 | 730 | 840 | 960 | 12.9 | 94 |
| | 7(1) | <0.3 | 0.8 | 37 | <2 | 69 | (25) | <100 | 640 | 230 | 740 | 13.1 | |
| | 8 | 0.022 | 26 | 0.46 | 3.8 | 53 | 59 | 64 | 190 | 1,000 | 190 | 2.8 | 94 |
| | 9 | 0.11 | 10 | 14 | 0.04 | 30 | 48 | 64 | 1,200 | 380 | 750 | 15.5 | 82 |
| | 10(1) | <0.3 | 6.1 | 10.6 | <2 | 28 | 60 | <100 | 440 | 170 | <90 | 15.0 | |
| | 11 | 0.06 | 29 | 1.1 | 0.04 | 56 | 53 | 64 | 130 | 15,500 | 210 | 7.7 | 103 |

TABLE XV-continued

Elemental Analysis of Asbestos Samples

|  | Al % | Fe % | Mg % | Na$_2$O % | SiO$_2$ % | Co ppm | Cr ppm | Mn ppm | Ni ppm | H$_2$O % | Material balance % |
|---|---|---|---|---|---|---|---|---|---|---|---|
| 12 | 0.04 | 16 | 0.26 | 3.2 | 63 | 69 | 38 | 78 | 520 | 140 | 6.7 | 94 |
| 13(1) | <0.3 | 0.85 | 17 | <2 | 35 | 56 | 7.6% | 580 | 130 | N.A. | 15.4 |  |
| 14(1) | <0.3 | 0.6 | 26 | <2 | 49 | (14) | <100 | 25% | N.A. | 530 | 6.4 |  |
| 15(1) | <0.3 | 0.4 | 23 | <2 | 43 | 33 | <100 | 13% | N.A. | 390 | 9.2 |  |
| 16 | 0.053 | 0.81 | 10 | 0.03 | 32 | 43 | 68 | 580 | 11% | 860 | 24.8 | 89 |
| 17(1) | <0.3 | 8.8 | 41 | <2 | 73 | (1) | <100 | 740 | 150 | 520 | 19.8 |  |
| 18 | 0.16 | 6.6 | 17 | 0.05 | 56 | 49 | 37 | 540 | 600 | 760 | 13.8 | 107 |
| 19 | 0.30 | 9.5 | 16 | 0.05 | 49 | 47 | 44 | 640 | 540 | 820 | 13.8 | 102 |
| 20 | 0.22 | 15.5 | 12 | 0.02 | 30 | 42 | 45 | 3,800 | 390 | 560 | 17.7 | 88 |
| 21 | 0.016 | 10 | 20 | 0.08 | 48 | 43 | 64 | 430 | 480 | 720 | 10.4 | 105 |

|  | Al | Fe | Mg | Na$_2$O | AAS/PIXE |  |
|---|---|---|---|---|---|---|
| chrysotile | 0.1–0.8 | 0.07–8.5 | 23–27 |  |  | 12–15 |
| amosite | 1.1–4.7 | 26.–34 | 0.6–4 |  | 49–53 | 2–5 |
| crocidolite |  | 22–29 | 0.18 | 4.0–8.5 | 49–53 | 2.5–4.5 |

(1) analyzed by PIXE
N.A. - not analyzed

I claim:

1. A method for rendering silicate minerals less harmful to living cells comprising the step of:
   contacting a silicate mineral with
   (a) a metal-weak base-strong acid ion system, wherein said system comprises (i) an aqueous solution containing at least three ions, said three ions including a cation from a weak base, an anion from a strong acid and a metal ion, or (ii) an aqueous solution containing at least two ions, said two ions including a cation from a weak base and a metal-containing anion from a strong acid, or
   (b) a metal-strong base-weak acid ion system, wherein said system comprises an aqueous solution containing at least three ions, said three ions including a cation from a strong base, an anion from a weak acid and a metal ion,
   wherein said metal is selected from the group consisting of manganese, chromium, cobalt, iron, copper, aluminum and mixtures thereof, and
   whereby said metal-weak base-strong acid ion system or said metal-strong base-weak acid ion system forms a metal-micelle polymer silicate mineral by inducing formation of a metal-micelle polymer coating on said silicate mineral, said polymer coating being ionically bonded to said silicate mineral.

2. The method of claim 1 wherein said metal is iron.

3. The method of claim 2 wherein said metal-weak base-strong acid ion system comprises an aqueous solution of NH$_4$Fe(SO$_4$)$_2$.

4. The method of claim 2 wherein said metal-weak base-strong acid ion system comprises an aqueous solution of NH$_4$Fe(SO$_4$)$_2$.12H$_2$O.

5. The method of claim 1 wherein said contacting occurs at a temperature within the range of about 20° C. to about 100° C.

6. The method of claim 1 wherein said contacting occurs at a pH of from about 1 to about 8.

7. The method of claim 6 wherein said contacting occurs at a pH of from about 3 to about 7.

8. The method of claim 1 wherein said metal-micelle polymer silicate mineral contains from about 5% to about 18% by weight more metal than said silicate mineral.

9. The method of claim 8 wherein said metal-micelle polymer silicate mineral contains from about 5% to about 10% by weight more metal than said silicate mineral.

10. A method for making metal-micelle polymer asbestos comprising the step of:
    contacting asbestos fibre with
    (a) a metal-weak base-strong acid ion system, wherein said system comprises (i) an aqueous solution containing at least three ions, said three ions including a cation from a weak base, an anion from a strong acid and a metal ion, or (ii) an aqueous solution containing at least two ions, said two ions including a cation from a weak base and a metal-containing anion from a strong acid, or
    (b) a metal-strong base-weak acid ion system, wherein said system comprises an aqueous solution containing at least three ions, said three ions including a cation from a strong base, an anion from a weak acid and a metal ion,
    wherein said metal is selected from the group consisting of manganese, chromium, cobalt, iron, copper, aluminum and mixtures thereof, and
    whereby said metal-weak base-strong acid ion system or said metal-strong base-weak acid ion system forms a metal-micelle polymer asbestos by inducing formation of a metal-micelle polymer coating on said asbestos fibre, said polymer coating being ionically bonded to said asbestos fibre.

11. The method of claim 10 wherein said contacting occurs under conditions whereby sufficient metal-micelle polymer is formed on said asbestos fibres to block the biologically reactive sites of said asbestos fibres.

12. The method of claim 10 wherein said metal is iron.

13. The method of claim 12 wherein said metal-weak base-strong acid ion system comprises an aqueous solution of NH$_4$Fe(SO$_4$)$_2$.

14. The method of claim 12 wherein said metal-weak base-strong acid system comprises an aqueous solution of NH$_4$Fe(SO$_4$)$_2$.12H$_2$O.

15. The method of claim 10 wherein said contacting occurs at a temperature within the range of about 20° C. to about 100° C.

16. The method of claim 10 wherein said contacting occurs at a pH of from about 1 to about 8.

17. The method of claim 16 wherein said contacting occurs at a pH of from about 3 to about 7.

18. The method of claim 10 wherein said metal-micelle polymer asbestos contains from about 5% to about 18% by weight more metal than said asbestos fibres.

19. The method of claim 18 wherein said metal-micelle polymer asbestos contains from about 5% to about 10% by weight more metal than said asbestos fibres.

20. A metal-micelle polymer asbestos comprising the reaction product of asbestos fibres with
(a) a metal-weak base-strong acid ion system, wherein said system comprises (i) an aqueous solution containing at least three ions, said three ions including a cation from a weak base, an anion from a strong acid and a metal ion, or (ii) an aqueous solution containing at least two ions, said two ions including a cation from a weak base and a metal-containing anion from a strong acid, or
(b) a metal-strong base-weak acid ion system, wherein said system comprises an aqueous solution containing at least three ions, said three ions including a cation from a strong base, an anion from a weak acid and a metal ion,
wherein said metal is selected from the group consisting of manganese, chromium, cobalt, iron, copper, aluminum and mixtures thereof.

21. The metal-micelle polymer asbestos of claim 20, wherein said metal-micelle polymer asbestos contains sufficient metal-micelle polymer coating to block the biologically reactive sites of said asbestos fibres.

22. The metal-micelle polymer asbestos of claim 20 wherein said metal is iron.

23. A metal-micelle polymer chrysotile asbestos having repeating units of the formula

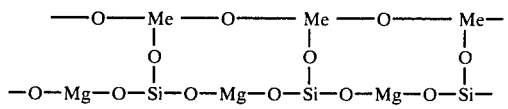

wherein Me is a metal selected from the group consisting of manganese, chromium, cobalt, iron, copper, aluminum, and mixtures thereof.

24. The metal-micelle polymer chrysotile asbestos of claim 23, wherein said metal-micelle polymer asbestos contains sufficient metal-micelle polymer to block the biologically reactive sites of said asbestos.

25. The metal-micelle polymer asbestos of claim 23 wherein Me is iron (Fe).

26. A metal-micelle amosite asbestos having repeating units of the formula

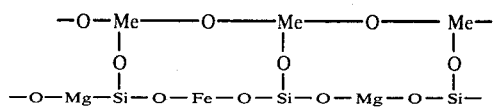

wherein Me is a metal selected from the group consisting of manganese, chromium, cobalt, iron, copper, aluminum, and mixtures thereof.

27. The metal-micelle amosite asbestos of claim 26 wherein Me is iron (Fe).

28. A metal-micelle anthophyllite asbestos having repeating units of the formula

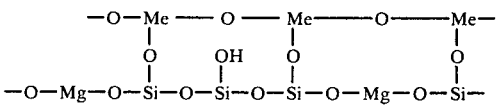

wherein Me is a metal selected from the group consisting of manganese, chromium, cobalt, iron, copper, aluminum, and mixtures thereof.

29. The metal-micelle anthophyllite asbestos of claim 28 wherein Me is iron (Fe).

30. A metal-micelle crocidolite asbestos having repeating units of the formula

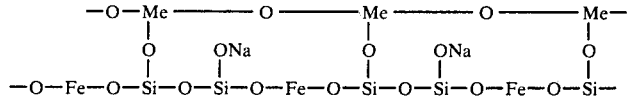

wherein Me is metal selected from the group consisting of manganese, chromium, cobalt, iron, copper, aluminum, and mixtures thereof.

31. The metal-micelle crocidolite asbestos of claim 30 wherein Me is iron (Fe).

* * * * *